US012029703B2

(12) United States Patent
Hansen et al.

(10) Patent No.: US 12,029,703 B2
(45) **Date of Patent: *Jul. 9, 2024**

(54) BODY PULSATING APPARATUS AND METHOD

(71) Applicant: ELECTROMED, INC., New Prague, MN (US)

(72) Inventors: Craig N. Hansen, Plymouth, MN (US); Paul C. Cross, Shorewood, MN (US)

(73) Assignee: ELECTROMED, INC., New Prague, MN (US)

(*) Notice: Subject to any disclaimer, the term of this patent is extended or adjusted under 35 U.S.C. 154(b) by 890 days.

This patent is subject to a terminal disclaimer.

(21) Appl. No.: 16/698,261

(22) Filed: Nov. 27, 2019

(65) Prior Publication Data

US 2020/0170878 A1 Jun. 4, 2020

Related U.S. Application Data

(60) Continuation of application No. 15/066,113, filed on Mar. 10, 2016, now abandoned, which is a division of (Continued)

(51) Int. Cl.
*A61H 9/00* (2006.01)
*A61H 23/04* (2006.01)

(52) U.S. Cl.
CPC ........... *A61H 9/0078* (2013.01); *A61H 23/04* (2013.01); *A61H 2201/0157* (2013.01);

(Continued)

(58) Field of Classification Search
CPC ...... A61H 9/00; A61H 9/0078; A61H 9/0007; A61H 23/04; A61H 2201/1619; F04B 17/00; F04B 17/03; F04B 9/042
See application file for complete search history.

(56) References Cited

U.S. PATENT DOCUMENTS

| | | | |
|---|---|---|---|
| 5,462 | A | 2/1848 | Barlow |
| 13,643 | A | 10/1855 | Garrette |

(Continued)

FOREIGN PATENT DOCUMENTS

| | | | |
|---|---|---|---|
| EP | 2830568 A1 | 2/2015 | |
| JP | 61152982 A | 7/1986 | |

(Continued)

OTHER PUBLICATIONS

International Search Report for corresponding International Application No. PCT/US/2013/00094, dated Aug. 29, 2013, 4 pages.

(Continued)

*Primary Examiner* — Justine R Yu
*Assistant Examiner* — Christopher E Miller
(74) *Attorney, Agent, or Firm* — Winthrop & Weinstine, P.A.

(57) ABSTRACT

A device and method coupled to a therapy garment to apply pressure and repetitive compression forces to a body of a person has a positive air pulse generator and a user programmable time, frequency and pressure controller operable to regulate the duration of operation, frequency of the air pulses and a selected air pressure applied to the body of a person. The air pulse generator has rigid displacers that are angularly moved with power transmission assemblies to draw air into the air pulse generator and discharge air pressure pulses to the therapy garment.

21 Claims, 17 Drawing Sheets

Related U.S. Application Data application No. 13/431,956, filed on Mar. 27, 2012, now Pat. No. 10,016,335.

(52) U.S. Cl.
CPC ................ *A61H 2201/1215* (2013.01); *A61H 2201/1619* (2013.01); *A61H 2201/165* (2013.01); *A61H 2201/5002* (2013.01); *A61H 2201/5005* (2013.01); *A61H 2201/5038* (2013.01); *A61H 2201/5079* (2013.01)

(56) References Cited

U.S. PATENT DOCUMENTS

| | | | |
|---|---|---|---|
| 108,264 | A | 10/1870 | Holman |
| 235,782 | A | 12/1880 | Kimble, Jr. |
| 285,271 | A | 9/1883 | Jackson |
| 435,506 | A | 9/1890 | Longworth |
| 454,180 | A | 6/1891 | McLennan |
| 565,646 | A | 8/1896 | Thierkoff |
| 864,220 | A | 8/1907 | Ackerman et al. |
| 907,859 | A | 12/1908 | Neumann |
| 961,618 | A | 6/1910 | Keller |
| 1,242,692 | A | 10/1917 | Hibner |
| 1,266,252 | A | 5/1918 | Hadford |
| 1,404,116 | A | 1/1922 | Heinrich |
| 1,416,174 | A | 5/1922 | Cook |
| 2,359,819 | A | 10/1944 | Bachrach |
| 2,433,461 | A | 12/1947 | Kuttner |
| 3,120,192 | A | 2/1964 | Winchell |
| 3,795,242 | A | 3/1974 | Lerch et al. |
| 3,818,806 | A | 6/1974 | Fumagalli |
| 3,844,277 | A | 10/1974 | Pahl |
| 4,058,857 | A | 11/1977 | Runge et al. |
| 4,299,097 | A | 11/1981 | Shank et al. |
| 4,349,015 | A | 9/1982 | Alferness |
| 4,384,833 | A | 5/1983 | Shank et al. |
| 4,410,305 | A | 10/1983 | Shank et al. |
| 4,457,673 | A | 7/1984 | Conley et al. |
| 4,565,497 | A | 1/1986 | Miller et al. |
| 4,583,972 | A | 4/1986 | Hunter, III et al. |
| 4,610,608 | A | 9/1986 | Grant |
| 4,618,318 | A | 10/1986 | Hansen |
| 4,646,733 | A | 3/1987 | Stroh et al. |
| 4,667,468 | A | 5/1987 | Hansen |
| 4,823,743 | A | 4/1989 | Ansdale |
| 4,838,263 | A | 6/1989 | Warwick et al. |
| 5,056,505 | A | 10/1991 | Warwick et al. |
| 5,086,767 | A | 2/1992 | Legal |
| 5,092,752 | A | 3/1992 | Hansen |
| 5,193,986 | A | 3/1993 | Grant et al. |
| 5,232,353 | A | 8/1993 | Grant |
| 5,314,469 | A | 5/1994 | Gao |
| 5,453,081 | A | 9/1995 | Hansen |
| 5,690,165 | A | 11/1997 | Roth et al. |
| 5,769,797 | A | 6/1998 | Van Brunt et al. |
| 5,769,800 | A | 6/1998 | Gelfand et al. |
| 6,036,662 | A | 3/2000 | Van Brunt et al. |
| 6,364,637 | B1 | 4/2002 | Hase et al. |
| 6,474,288 | B1 | 11/2002 | Blom |
| 6,547,749 | B2 | 4/2003 | Hansen |
| 6,676,614 | B1 | 1/2004 | Hansen et al. |
| 7,121,808 | B2 | 10/2006 | Van Brunt et al. |
| 7,194,942 | B2 | 3/2007 | Lee |
| D567,861 | S | 4/2008 | Chen |
| 7,537,575 | B2 | 5/2009 | Hansen et al. |
| RE40,814 | E | 6/2009 | Van Brunt et al. |
| 7,578,293 | B2 | 8/2009 | Matthiessen et al. |
| 7,770,479 | B2 | 8/2010 | Hansen et al. |
| 7,785,280 | B2 | 8/2010 | Kivisto |
| 8,197,428 | B2 | 7/2012 | Helgeson et al. |
| D697,197 | S | 1/2014 | Hansen et al. |
| 2004/0097843 | A1 * | 5/2004 | Van Brunt ........... A61H 9/0078 601/44 |
| 2008/0000477 | A1 | 1/2008 | Huster et al. |
| 2008/0086062 | A1 | 4/2008 | Hansen et al. |
| 2008/0286133 | A1 | 11/2008 | He et al. |
| 2009/0093740 | A1 | 4/2009 | Helgeson et al. |
| 2009/0221941 | A1 | 9/2009 | Ikeler et al. |
| 2009/0234256 | A1 | 9/2009 | Helgeson et al. |
| 2010/0288364 | A1 | 11/2010 | Singh et al. |
| 2011/0064572 | A1 | 3/2011 | Martin et al. |
| 2012/0016282 | A1 | 1/2012 | Van Brunt et al. |
| 2012/0082574 | A1 * | 4/2012 | Wang .................... F04B 17/042 417/412 |
| 2013/0261518 | A1 | 10/2013 | Hansen et al. |
| 2013/0289456 | A1 * | 10/2013 | Chang Guo ......... A61H 9/0007 601/149 |
| 2013/0331747 | A1 | 12/2013 | Helgeson et al. |

FOREIGN PATENT DOCUMENTS

| | | | |
|---|---|---|---|
| JP | 61179159 | A | 8/1986 |
| JP | 2749091 | B2 | 5/1998 |
| JP | 2008206963 | A | 9/2008 |
| JP | 2010540162 | A | 12/2010 |
| KR | 101092790 | B1 | 3/2007 |
| KR | 1020110107864 | A | 10/2011 |
| WO | WO2007086765 | A1 | 8/2007 |
| WO | 2013147964 | A1 | 10/2013 |

OTHER PUBLICATIONS

Written Opinion of International Searching Authority for corresponding International Application No. PCT/US/2013/00094, dated Aug. 29, 2013, 25 pages.

Notice of Allowance and English translation for related Korean Application No. 10-2018-7023504, dated Nov. 28, 2019, 5 pages.

Notice of Allowance and English translation for related Korean Application No. 10-2018-7023509, dated Dec. 26, 2019, 3 pages.

Examination Report for related Indian Application 7598/CHENP/2014, dated Aug. 28, 2020, 5 pages.

Examination Report and English translation for related Korean Application No. 10-2020-7010330, dated Nov. 30, 2020.

Office Action in Canadian Appln. No. 2,868,776, dated Jun. 4, 2019, 3 pages.

Office Action in Singaporean Appln. No. 10201702740P, dated May 16, 2023, 9 pages.

Search Report in Singaporean Appln. No. 10201607984W, dated Jun. 14, 2021, 10 pages.

Office Action in Mexican Appln. No. MX/a/2018/011449, mailed on Apr. 25, 2024, 14 pages (with English machine translation).

* cited by examiner

BODY PULSATING APPARATUS AND METHOD

CROSS REFERENCE TO RELATED APPLICATION

This application is a Continuation of U.S. application Ser. No. 15/066,113, filed on 10 Mar. 2016, which is a Divisional application Ser. No. 13/431,956, filed on 27 Mar. 2012, now U.S. Pat. No. 10,016,335, the contents of which are incorporated herein by reference. A claim of priority to all, to the extent appropriate, is made.

FIELD OF THE INVENTION

The invention relates to a medical device operable with a thoracic therapy garment and method to apply repetitive compression forces to the body of a person to aid blood circulation, loosen and eliminate mucus from the lungs and trachea and relieve muscular and nerve tensions.

BACKGROUND OF THE INVENTION

Clearance of mucus from the respiratory tract in healthy individuals is accomplished primarily by the body's normal mucociliary action and cough. Under normal conditions these mechanisms are very efficient. Impairment of the normal mucociliary transport system or hypersecretion of respiratory mucus results in an accumulation of mucus and debris in the lungs and can cause severe medical complications such as hypoxemia, hypercapnia, chronic bronchitis and pneumonia. These complications can result in a diminished quality of life or even become a cause of death. Abnormal respiratory mucus clearance is a manifestation of many medical conditions such as pertussis, cystic fibrosis, atelectasis, bronchiectasis, cavitating lung disease, vitamin A deficiency, chronic obstructive pulmonary disease, asthma, immotile cilia syndrome and neuromuscular conditions. Exposure to cigarette smoke, air pollutants and viral infections also adversely affect mucociliary function. Post surgical patients, paralyzed persons, and newborns with respiratory distress syndrome also exhibit reduced mucociliary transport.

Chest physiotherapy has had a long history of clinical efficacy and is typically a part of standard medical regimens to enhance respiratory mucus transport. Chest physiotherapy can include mechanical manipulation of the chest, postural drainage with vibration, directed cough, active cycle of breathing and autogenic drainage. External manipulation of the chest and respiratory behavioral training are accepted practices. The various methods of chest physiotherapy to enhance mucus clearance are frequently combined for optimal efficacy and are prescriptively individualized for each patient by the attending physician.

Cystic fibrosis (CF) is the most common inherited life-threatening genetic disease among Caucasians. The genetic defect disrupts chloride transfer in and out of cells, causing the normal mucus from the exocrine glands to become very thick and sticky, eventually blocking ducts of the glands in the pancreas, lungs and liver. Disruption of the pancreatic glands prevents secretion of important digestive enzymes and causes intestinal problems that can lead to malnutrition. In addition, the thick mucus accumulates in the lung's respiratory tracts, causing chronic infections, scarring, and decreased vital capacity. Normal coughing is not sufficient to dislodge these mucus deposits. CF usually appears during the first 10 years of life, often in infancy. Until recently, children with CF were not expected to live into their teens. However, with advances in digestive enzyme supplementation, anti-inflammatory therapy, chest physical therapy, and antibiotics, the median life expectancy has increased to 30 years with some patients living into their 50s and beyond. CF is inherited through a recessive gene, meaning that if both parents carry the gene, there is a 25 percent chance that an offspring will have the disease, a 50 percent chance they will be a carrier and a 25 percent chance they will be genetically unaffected. Some individuals who inherit mutated genes from both parents do not develop the disease. The normal progression of CF includes gastrointestinal problems, failure to thrive, repeated and multiple lung infections, and death due to respiratory insufficiency. While some persons experience grave gastrointestinal symptoms, the majority of CF persons (90 percent) ultimately succumb to respiratory problems.

Virtually all persons with cystic fibrosis (CF) require respiratory therapy as a daily part of their care regimen. The buildup of thick, sticky mucus in the lungs clogs airways and traps bacteria, providing an ideal environment for respiratory infections and chronic inflammation. This inflammation causes permanent scarring of the lung tissue, reducing the capacity of the lungs to absorb oxygen and, ultimately, sustain life. Respiratory therapy must be performed, even when the person is feeling well, to prevent infections and maintain vital capacity. Traditionally, care providers perform Chest Physical Therapy (CPT) one to four times per day. CPT consists of a person lying in one of twelve positions while a caregiver "claps" or pounds on the chest and back over each lobe of the lung. To treat all areas of the lung in all twelve positions requires pounding for half to three-quarters of an hour along with inhalation therapy. CPT clears the mucus by shaking loose airway secretions through chest percussions and draining the loosened mucus toward the mouth. Active coughing is required to ultimately remove the loosened mucus. CPT requires the assistance of a caregiver, often a family member but a nurse or respiratory therapist if one is not available. It is a physically exhausting process for both the CF person and the caregiver. Patient and caregiver non-compliance with prescribed protocols is a well-recognized problem that renders this method ineffective. CPT effectiveness is also highly technique sensitive and degrades as the giver becomes tired. The requirement that a second person be available to perform the therapy severely limits the independence of the CF person.

Persons confined to beds and chairs having adverse respiratory conditions, such as CF and airway clearance therapy, are treated with pressure pulsating devices that subject the person's thorax with high frequency pressure pulses to assist the lung breathing functions and blood circulation. The pressure pulsating devices are operatively coupled to thoracic therapy garments adapted to be worn around the person's upper body. In hospital, medical clinic, and home care applications, persons require easy application and low cost disposable thoracic garments connectable to portable air pressure pulsating devices that can be selectively located adjacent the left or right side of the persons.

Artificial pressure pulsating devices for applying and relieving pressure on the thorax of a person have been used to assist in lung breathing functions, and loosening and eliminating mucus from the lungs of CF persons. Subjecting the person's chest and lungs to pressure pulses or vibrations decreases the viscosity of lung and air passage mucus, thereby enhancing fluid mobility and removal from the lungs. An example of a body pulsating method and device disclosed by C. N. Hansen in U.S. Pat. No. 6,547,749, incorporated herein by reference, has a case accommodating an air pressure and pulse generator. A handle pivotally mounted on the case is used as a hand grip to facilitate transport of the generator. The case including the generator must be carried by a person to different locations to provide treatment to individuals in need of respiratory therapy. These devices use vests having air-accommodating bladders that surround the chests of persons. An example of a vest used with a body pulsating device is disclosed by C. N. Hansen and L. J. Helgeson in U.S. Pat. No. 6,676,614. The vest is used with an air pressure and pulse generator. Mechanical mechanisms, such as solenoid or motor-operated air valves, bellows and pistons are disclosed in the prior art to supply air under pressure to diaphragms and bladders in a regular pattern or pulses. Manually operated controls are used to adjust the pressure of the air and air pulse frequency for each person treatment and during the treatment. The bladder worn around the thorax of the CF person repeatedly compresses and releases the thorax at frequencies as high as 25 cycles per second. Each compression produces a rush of air through the lobes of the lungs that shears the secretions from the sides of the airways and propels them toward the mouth where they can be removed by normal coughing. Examples of chest compression medical devices are disclosed in the following U.S. Patents.

W. J. Warwick and L. G. Hansen in U.S. Pat. Nos. 4,838,263 and 5,056,505 disclose a chest compression apparatus having a chest vest surrounding a person's chest. A motor-driven rotary valve located in a housing located on a table allows air to flow into the vest and vent air therefrom to apply pressurized pulses to the person's chest. An alternative pulse pumping system has a pair of bellows connected to a crankshaft with rods operated with a dc electric motor. The speed of the motor is regulated with a controller to control the frequency of the pressure pulses applied to the vest. The patient controls the pressure of the air in the vest by opening and closing the end of an air vent tube. The apparatus must be carried by a person to different locations to provide treatment to persons in need of respiratory therapy.

M. Gelfand in U.S. Pat. No. 5,769,800 discloses a vest design for a cardiopulmonary resuscitation system having a pneumatic control unit equipped with wheels to allow the control unit to be moved along a support surface.

N. P. Van Brunt and D. J. Gagne in U.S. Pat. Nos. 5,769,797 and 6,036,662 disclose an oscillatory chest compression device having an air pulse generator including a wall with an air chamber and a diaphragm mounted on the wall and exposed to the air chamber. A rod pivotally connected to the diaphragm and rotatably connected to a crankshaft transmits force to the diaphragm during rotation of the crankshaft. An electric motor drives the crankshaft at selected controlled speeds to regulate the frequency of the air pulses generated by the moving diaphragm. A blower delivers air to the air chamber to maintain a positive pressure above atmospheric pressure of the air in the chamber. Controls for the motors that move the diaphragm and rotate the blower are responsive to the air pressure pulses and pressure of the air in the air chamber. These controls have air pulse and air pressure responsive feedback systems that regulate the operating speeds of the motors to control the pulse frequency and air pressure in the vest. The air pulse generator is a mobile unit having a handle and a pair of wheels.

C. N. Hansen in U.S. Pat. No. 6,547,749 also discloses a body pulsating apparatus having diaphragms operatively connected to a dc motor to generate air pressure pulses directed to a vest that subjects a person's body to high frequency pressure forces. A first manual control operates to control the speed of the motor to regulate the frequency of the air pressure pulses. A second manual control operates an air flow control valve to adjust the pressure of the air directed to the vest thereby regulating the vest pressure on the person's body. An increase or decrease of the speed of the motor changes the frequency of the air pressure pulses and the vest pressure on the person's body. The second manual control must be used by the person or caregiver to adjust the vest pressure to maintain a selected vest pressure.

C. N. Hansen, P. C. Cross and L. H. Helgeson in U.S. Pat. No. 7,537,575 discloses a method and apparatus for applying pressure and high frequency pressure pulses to the upper body of a person. A first user programmable memory controls the time of operation of a motor that operates the apparatus to control the duration of the supply of air under pressure and air pressure pulses to a vest located around the upper body of the person. A second user programmable memory controls the speed of the motor to regulate the frequency of the air pressure pulses directed to the vest. A manual operated air flow control valve adjusts the pressure of air directed to the vest thereby regulating the vest pressure on the person's upper body. An increase or decrease of the speed of the motor changes the frequency of the air pressure pulses and changes the vest pressure on the person's upper body. The manually operated air flow control valve must be used by the person or caregiver to maintain a selected vest pressure. The vest pressure is not programmed to maintain a selected vest air pressure.

N. P. Van Brunt and M. A. Weber in U.S. Pat. No. 7,121,808 discloses a high frequency air pulse generator having an air pulse module with an electric motor. The module includes first and second diaphragm assemblies driven with a crankshaft operatively connected to the electric motor. The air pulse module oscillates the air in a sinusoidal waveform pattern within the air chamber assembly at a selected frequency. A steady state air pressure is established in the air chamber with a blower driven with a separate electric motor. A control board carries electronic circuitry for controlling the operation of the air pulse module. Heat dissipating structure is used to maximize the release of heat from the heat generated by the electronic circuitry and electric motors.

SUMMARY OF THE INVENTION

The invention is a medical device and method to deliver high-frequency thoracic wall oscillations to promote airway clearance and improve bronchial drainage in humans. The primary components of the device include an air pulse generator with user programmable time, frequency and pressure controls, an air inflatable thoracic garment, and a flexible hose coupling the air pulse generator to the thoracic garment for transmitting air pressure and pressure pulses from the air pulse generator to the thoracic garment. The air pulse generator has an air displacer assembly that provides consistent and positive air displacement, air pressure and air flow to the thoracic garment. The air displacer assembly has two rigid one-piece members or displacers that angularly move relative to each other to draw air from an air flow control valve and discharge air pressure pulses at selected frequencies to the thoracic garment. An alternative air displacer assembly has one rigid one-piece displacer that angularly moves to draw air from an air flow control valve and discharge air pressure pulses at selected frequencies to the thoracic garment to subject the thoracic wall of a person to high-frequency oscillations. Diaphragms and elastic members are not used in the air displacer assembly. A power drive system including separate power transmission assemblies having eccentric crankshafts angularly move the rigid displacers in opposite directions. These eccentric crankshafts of the power transmission assemblies are driven by a variable speed electric motor regulated with a programmable controller. The air pulse generator is shown mounted on a portable pedestal having wheels that allow the generator to be moved to different locations to provide therapy treatments to a number of persons. The portable pedestal allows the air pulse generator to be located adjacent opposite sides of a person confined to a bed or chair. The pedestal includes a linear lift that allows the elevation or height of the air pulse generator to be adjusted to accommodate different locations and persons. The thoracic therapy garment has an elongated flexible bladder or air core having one or a plurality of elongated generally parallel chambers for accommodating air. An air inlet connector joined to a lower portion of the air core is releasably coupled to a flexible hose joined to the air pulse outlet of the air pulse generator. The thoracic therapy garment may be reversible with a single air inlet connector that can be accessed from either side of a person's bed or chair. The air pulse generator includes a housing supporting air pulse generator controls for convenient use. The air pulse generator controls include a control panel having user interactive controls for activating an electronic memory program to regulate the time or duration of operation of the air pulse generator, the frequency of the air pulses and the pressure of the air pulses directed to the therapy garment. The pressure of the air established by the air pulse-generator is coordinated with the frequency of the air pulses whereby the air pressure is substantially maintained at a selected pressure when the pulse frequency is changed.

DESCRIPTION OF INVENTION

Figure 1:
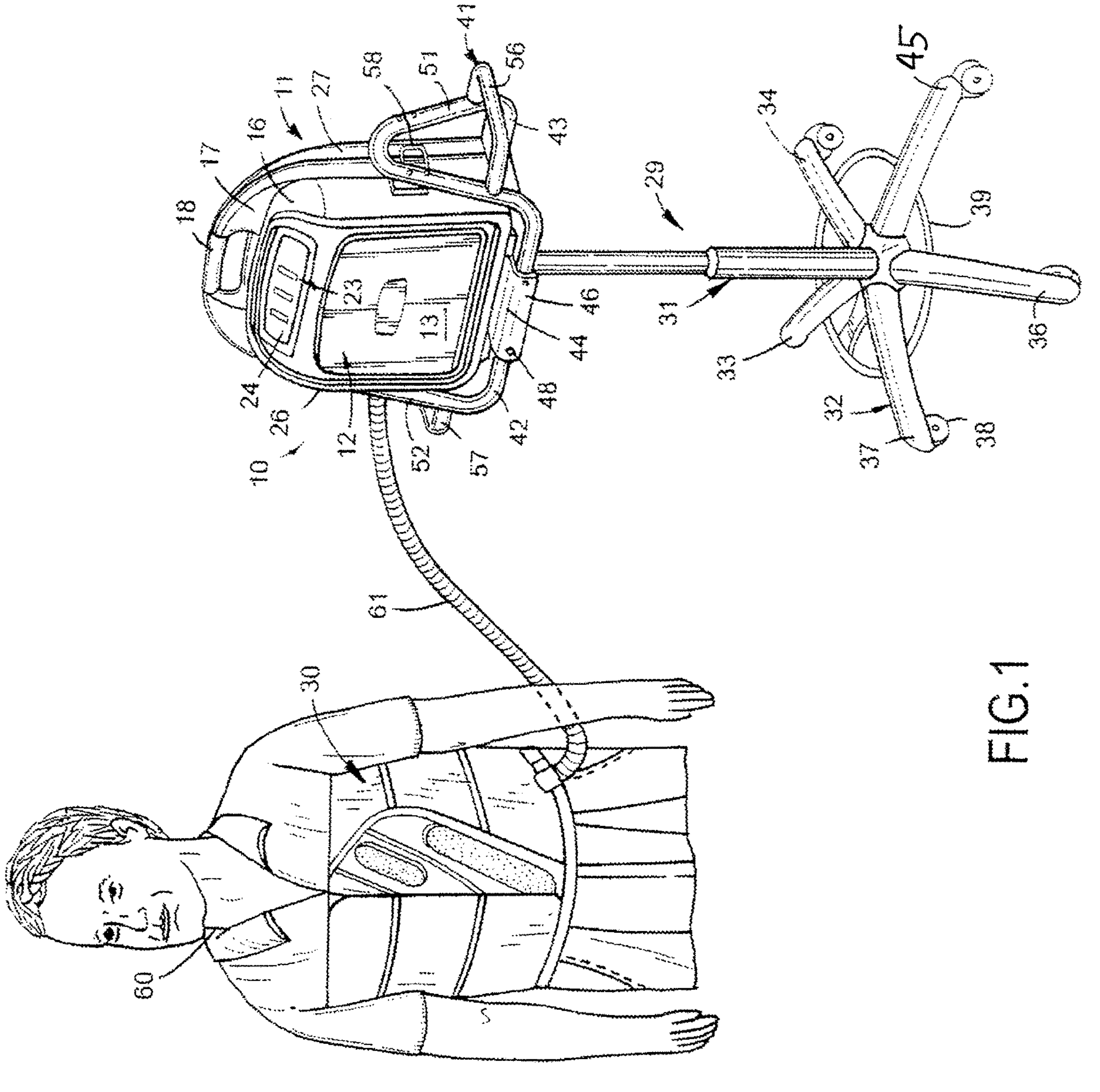
FIG. 1 is a perspective view of a thoracic therapy garment located around the thorax of a person connected with a hose to a pedestal mounted air pulse generator.

A human body pulsing apparatus 10 for applying high frequency pressure pulses to the thoracic wall 69 of a person 60, shown in FIG. 1, comprises an air pulse generator 11 having a housing 12 and a thoracic therapy garment 30. A movable pedestal 29 supports generator 11 and housing 12 on a surface, such as a floor. Pedestal 29 allows respiratory therapists and patient care persons to transport the entire human body pulsating apparatus to different locations accommodating a number of persons in need of respiratory therapy and to storage locations. Air pulse generator 11 can be separated from pedestal 29 and used to provide respiratory therapy to portions of a person's body.

Human body pulsing apparatus 10 is a device used with a thoracic therapy garment 30 to apply pressure and repetitive high frequencies pressure pulses to a person's thorax to provide secretion and mucus clearance therapy. Respiratory mucus clearance is applicable to many medical conditions, such as pertussis, cystic fibrosis, atelectasis, bronchiectasis, cavitating lung disease, vitamin A deficiency, chronic obstructive pulmonary disease, asthma, and immobile cilia syndrome. Post surgical patients, paralyzed persons, and newborns with respiratory distress syndrome have reduced mucociliary transport. Air pulse generator 11 through hose 61 provides high frequency chest wall oscillations or pulses to a person's thorax enhance mucus and airway clearance in a person with reduced mucociliary transport. High frequency pressure pulses subjected to the thorax in addition to providing respiratory therapy to a person's lungs and trachea.

As shown in FIG. 1, housing 12 is a generally rectangular member having a front wall 13 and side walls 26 and 27 joined to a top wall 16. An arched member 17 having a horizontal handle 18 extended over top wall 16 is joined to opposite portions of top wall 16 whereby handle 18 can be used to manually carry air pulse generator 11 and facilitate mounting air pulse generator 11 on pedestal 29. A control panel 23 mounted on top wall 16 has interactive controls on screen 24 to program time, frequency and pressure of air directed to the therapy garment 30. Other control devices including switches and dials can be used to program time, frequency and pressure of air transmitted to therapy garment 30. The controls on screen 24 are readily accessible by the respiratory therapists and user of pulsing apparatus 10.

Private care homes, assisted living facilities and clinics can accommodate a number of persons in different rooms or locations that require respiratory therapy or high frequency chest wall oscillations as medical treatments. Air pulse generator 11 can be manually moved to required locations and connected with a flexible hose 61 to a thoracic therapy garment 30 located around a person's thorax. Air pulse generator 11 can be selectively located adjacent the left or right side of a person 60 who may be confined to a bed or chair.

Pedestal 29 has an upright gas operated piston and cylinder assembly 31 mounted on a base 32 having outwardly extended legs 33, 34, 45, 36 and 37. Other types of linear expandable and contractible devices can be used to change the location of generator 11. Caster wheels 38 are pivotally mounted on the outer ends of the legs to facilitate movement of body pulsating apparatus 10 along a support surface. One or more wheels 38 are provided with releasable brakes to hold apparatus 10 in a fixed location. An example of a pedestal is disclosed by L. J. Helgeson and Michael W. Larson in U.S. Pat. No. 7,713,219, incorporated herein by reference. Piston and cylinder assembly 31 is linearly extendable to elevate air pulse generator 11 to a height convenient to the respiratory therapist or user. A gas control valve having a foot operated ring lever 39 is used to regulate the linear extension of piston and cylinder assembly 31 and resultant elevation of pulse generator 11. Air pulse generator 11 can be located in positions between its first (closed) and second (open) positions. Lever 39 and gas control valve are operatively associated with the lower end of piston and cylinder assembly 31.

A frame assembly 41 having parallel horizontal members 42 and 43 and a platform 44 mounts housing 12 of air pulse generator 11 on top of upright piston and cylinder assembly 31. The upper member of piston and cylinder assembly 31 is secured to the middle of platform 44. The opposite ends 46 of platform 44 are turned down over horizontal members 42 and 43 and secured thereto with fasteners 48. Upright inverted U-shaped arms 51 and 52 joined to opposite ends of horizontal members 42 and 43 are located adjacent opposite side walls 26 and 27 of housing 12. U-shaped handles 56 and 57 are joined to and extend outwardly from arms 51 and 52 provide hand grips to facilitate manual movement of the air pulse generator 11 and pedestal 29 on a floor or carpet. An electrical female receptacle 58 mounted on side wall 27 faces the area surrounded by arm 51 so that arm 51 protects the male plug (not shown) that fits into receptacle 58 to provide electric power to air pulse generator 11. A tubular air outlet sleeve is mounted on side wall 26 of housing 12. Hose 61 leading to thoracic therapy garment 30 telescopes into the sleeve to allow air, air pressure and air pulses to travel through hose 61 to thoracic therapy garment 30 to apply pressure and pulses to a person's body.

Figure 3:
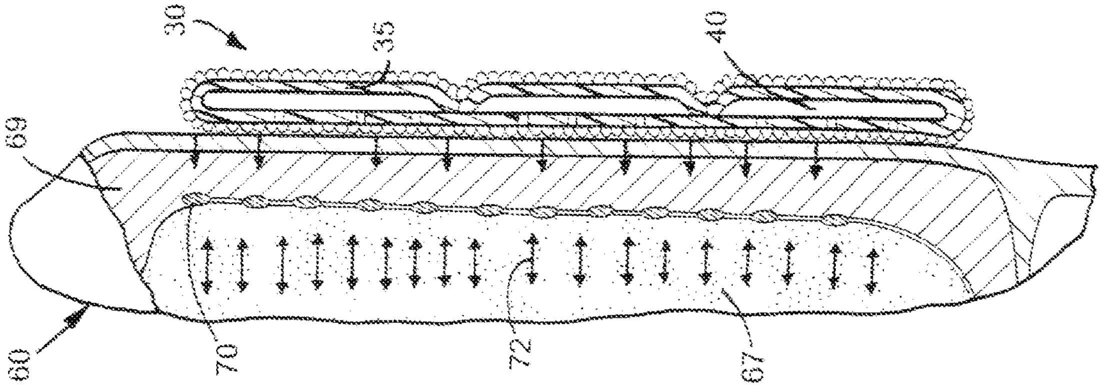
FIG. 3 is an enlarged sectional view of the right side of the thoracic therapy garment of FIG. 2 on the thorax of a person.

Thoracic therapy garment 30, shown in FIG. 3, is located around the person's thoracic wall 69 in substantial surface contact with the entire circumference of thoracic wall 69. Garment 30 includes an air core 35 having one or more enclosed chambers 40 for accommodating air pulses and air under pressure. The pressure of the air in the enclosed chambers 40 retains garment 30 in firm contact with thoracic wall 69. Air core 35 has a plurality of holes that vent air from enclosed chambers 40. Thoracic therapy garment 30 functions to apply repeated high frequency compression or pressure pulses, shown by arrows 71 and 72, to the person's lungs 66 and 67 and trachea 68. The reaction of lungs 66 and 67 and trachea 68 to the pressure pulses causes repetitive expansion and contraction of the lung tissue resulting in secretions and mucus clearance therapy. The thoracic cavity occupies only the upper part of the thoracic cage which contains lungs 66 and 67, heart 62, arteries 63 and 64, and rib cage 70. Rib cage 70 also aids in the distribution of the pressure pulses to lungs 66 and 67 and trachea 68.

Figure 4:
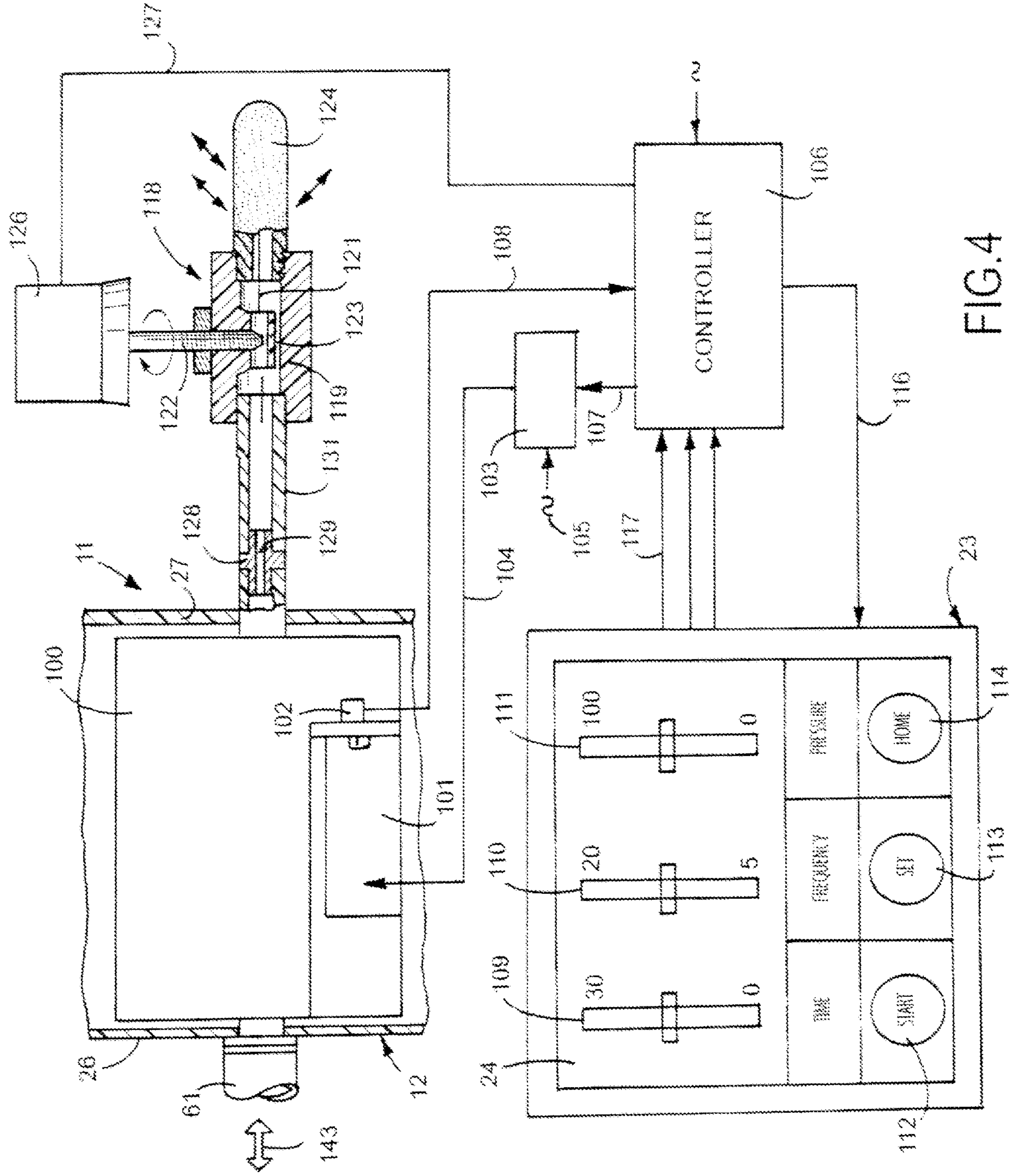
FIG. 4 is a diagram of the user programmable control system for the air pulse generator of FIG. 1.
Figure 5:
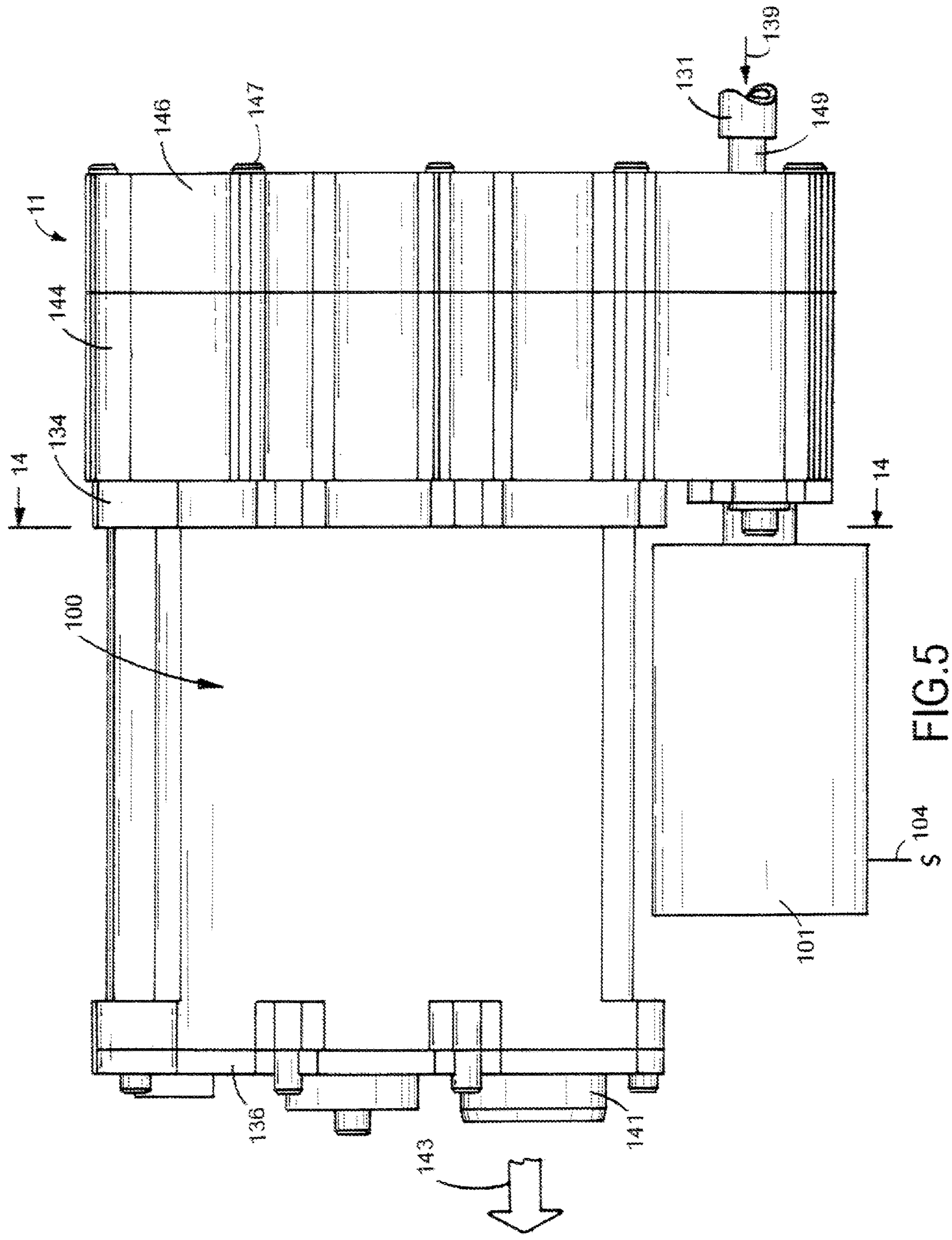
FIG. 5 is a top plan view of the air pulse generator.
Figure 6:
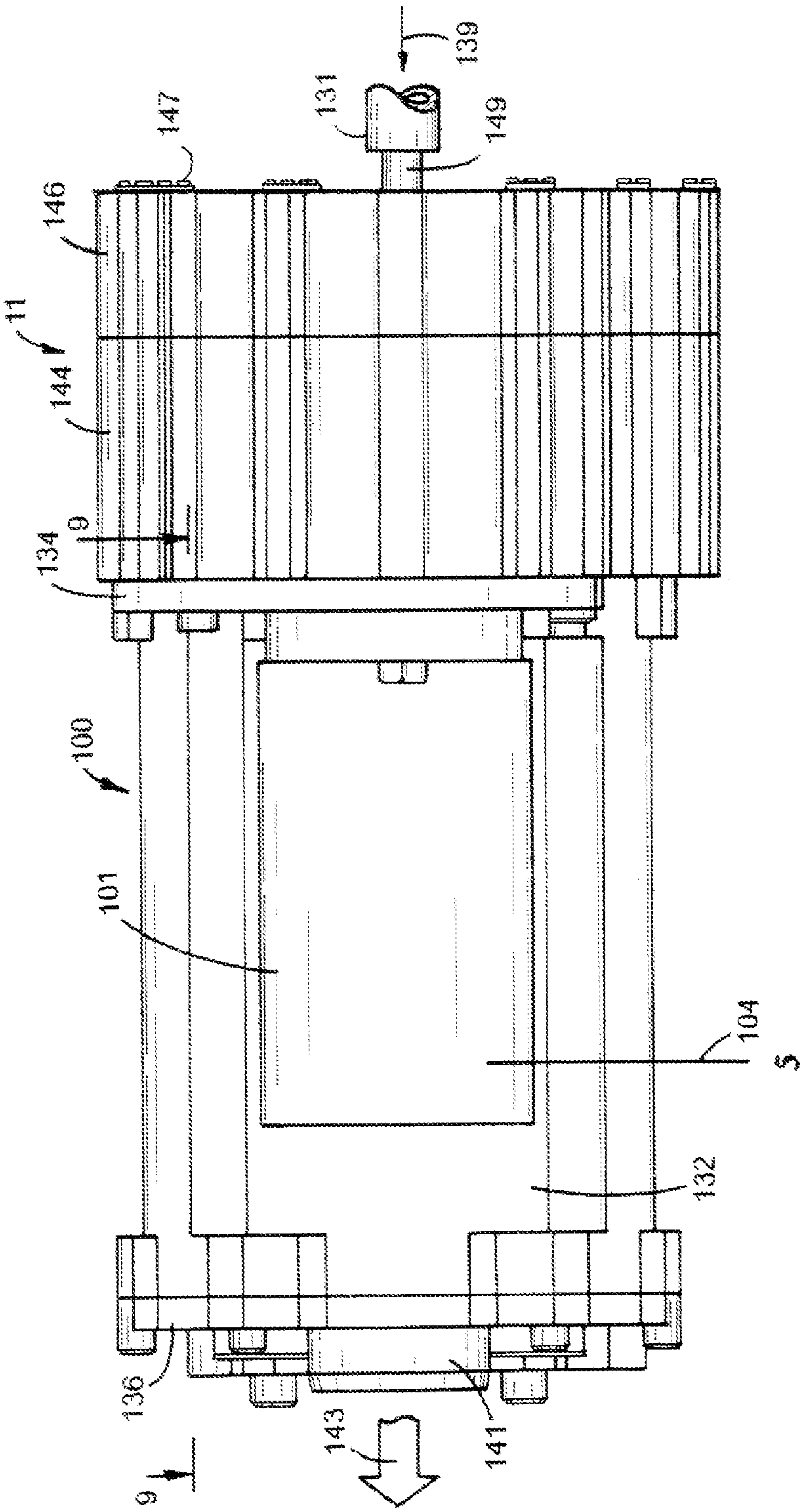
FIG. 6 is a front elevational view of the air pulse generator shown in FIG. 5.
Figure 7:
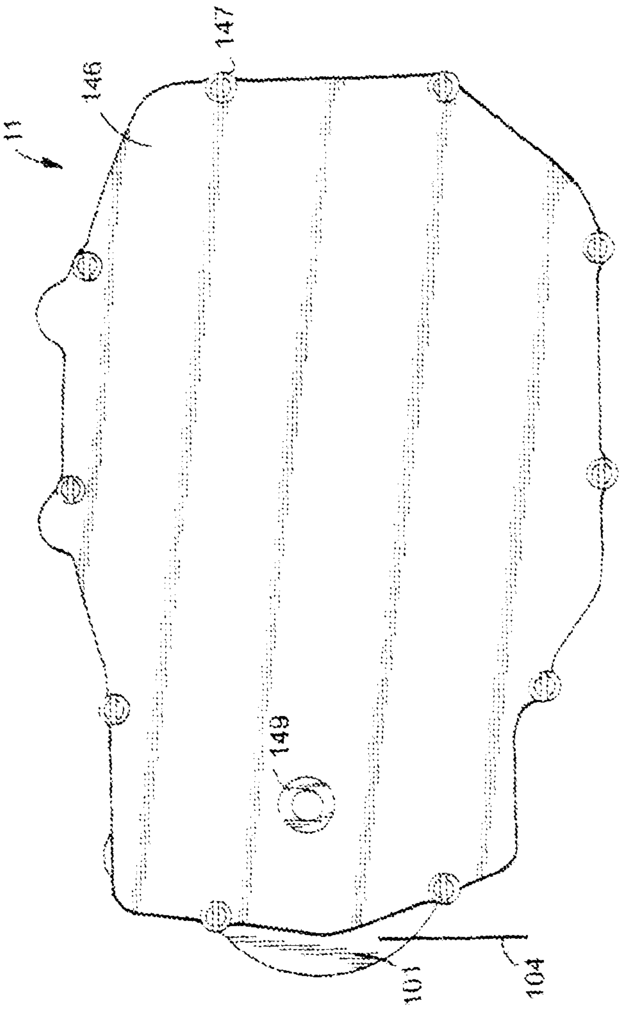
FIG. 7 is an end elevational view of the right end of the air pulse generator shown in FIG. 5.
Figure 8:
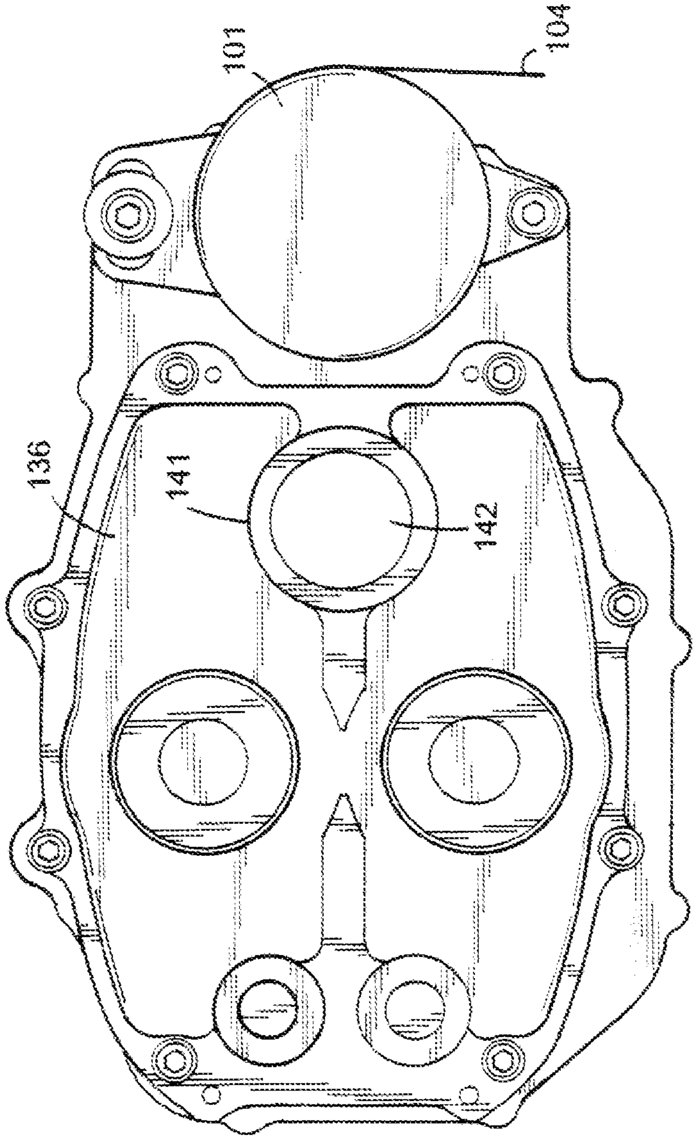
FIG. 8 is an end elevational view of the left end of the air pulse generator shown in FIG. 5.

As shown in FIG. 4, air pulse generator 11 has a housing 100 located within housing 12. An electric motor 101 mounted on housing 100 operates to control the time duration and frequency of the air pulses produced by generator 11 and directed to garment 30. A sensor 102, such as a Hall effect sensor, is used to generate a signal representing the rotational speed of motor 101. A motor speed control regulator 103 wired with an electric cable 104 to motor 101 controls the operating speed of motor 101. An electric power source 105 wired to motor speed control regulator 103 supplies electric power to regulator 130 which controls the electric power to electric motor 101. The electric power source can be conventional grid electric power and/or a battery. Other devices can be used to determine the speed of motor 101 and provide speed data to controller 106. A sensor-less commutation control of a 3-phase dc motor can be used to control the rotational speed of motor 101. A controller 106 having user programmable controls with memory components and a look-up data table wired with an electric cable 107 to motor speed control regulator 103 controls the time of operation of motor 101, the speed of motor 101 and the pressure of air directed to garment 30 shown by arrow 143. The signal generated by sensor 102 is transmitted by cable 108 to controller's look-up data table that coordinates the speed of motor 101 and resulting frequency of the air pulse with a selected air pressure to maintain a selected air pressure when the speed of motor 101 and frequency of the air pulses are changed. The look-up table is an array of digital data of the speed of motor 101 and air pressures created by the air pulse generator predetermined and stored in a static program storage which is initialized by changes in the speed of motor 101 to provide an output to stepper motor 126 to regulate air flow control member 122 to maintain a preset or selected air pressure created by air pulse generator 11. The look up table may include identifying algorithms designed to take several data inputs and extrapolate a reasoned response.

Screen 24 of control panel 23 may have three user interactive controls 109, 110 and 111. Control 109 is a time or duration of operation of motor 101. For example, the time can be selected from 0 to 30 minutes. Control 110 is a motor speed regulator to control the air pulse frequency for example between 5 and 20 cycles per second or Hz. A change of the air pulse frequency results in either an increase or decrease of the air pressure in garment 30. The pressure of the air in garment 30 is selected with the use of average or bias air pressure control 111. The changes of the time, frequency and pressure may be manually altered by applying finger pressure along the controls 109, 110 and 111. Control panel may include a start symbol 112 operable to connect air pulse generator 11 to an external electric power source. Set and home symbols 113 and 114 may be used to embed the selected time, frequency, and pressure in the memory data of controller 106. A cable 116 wires controller 106 with control panel 23. One or more cables 117 wire control panel 23 to controller 106 whereby the time, frequency and pressure signals generated by slider controls 109, 110 and 111 are transmitted to controller 106. Other types of panels and devices, including tactile switches in the form of resistive or capacitive technologies and dials can be used to provide user input to controller 106.

The air pressure in garment 30 is regulated with a first member shown as a proportional air flow control valve 118 having a variable orifice operable to restrict or choke the flow of air into and out of air pulse generator 11. Valve 118 has a body 119 having a first passage 121 to allow air to flow through body 119. An air flow control member or restrictor 122 having an end extended into the first passage regulates the flow of air through passage 121 into tube 131. Body 119 has a second air bypass passage 123 that allows a limited amount of air to flow into tube 131. The air in passage 123 bypasses air flow restrictor 122 whereby a minimum amount of air flows into air pulse generator 11 so that the minimum therapy treatment will not go down to zero. A filter 124 connected to the air inlet end of body 119 filters and allows ambient air to flow into and out of valve 118. Air flow restrictor 122 is regulated with a second member shown as a stepper motor 126. Stepper motor 126 has natural set index points called steps that remain fixed when there is no electric power applied to motor 126. Stepper motor 126 is wired with a cable 127 to controller 106 which controls the operation of motor 126. An example of a stepper motor controlled metering valve is disclosed by G. Sing and A. J. Home in U.S. Patent Application Publication No. US 2010/0288364. The stepper motor control is described by L. J. Helgeson and M. W. Larson in U.S. Provisional Patent Application Ser. No. 61/573,238, incorporated herein by reference. Other types of air flow meters having electronic controls, such as a solenoid control valve, a rotatable grooved ball valve or a movable disk valve, can be used to regulate the air flow to air pulse generator 11. An orifice member 128 has a longitudinal passage 129 located in tube 131. Orifice member 128 limits the maximum air flow into and out of air pulse generator 11 to prevent excessive air pressure in garment 30.

As shown in FIGS. 5 to 9, 11 and 13, air pulse generator housing 100 has a front wall 132 and a rear wall 133 with first and second pumping chambers 137 and 140 between walls 132 and 133. An interior wall 134 and end wall 136 attached to opposite ends of walls 132 and 133 enclose pumping chambers 137 and 140. As seen in FIG. 14, interior wall 134 has a plurality of passages 138 and 139 to allow air to flow from manifold chamber 148 into pumping chambers 137 and 140. Wall 134 can have additional passages, openings or holes to allow air to flow from manifold chamber 148 into pumping chambers 137 and 140. End wall 136 has an outwardly projected tubular boss 141 having a passage 142 to allow air, shown by arrow 143, to flow out of air pulse generator 11 into hose 61 and to garment 30. The frequency of the air flow pulses is regulated by varying the operating speed of motor 101. Air flow control valve 118 largely regulates the pressure of the air discharged from the air pulse generator 11 to garment 30.

Figure 9:
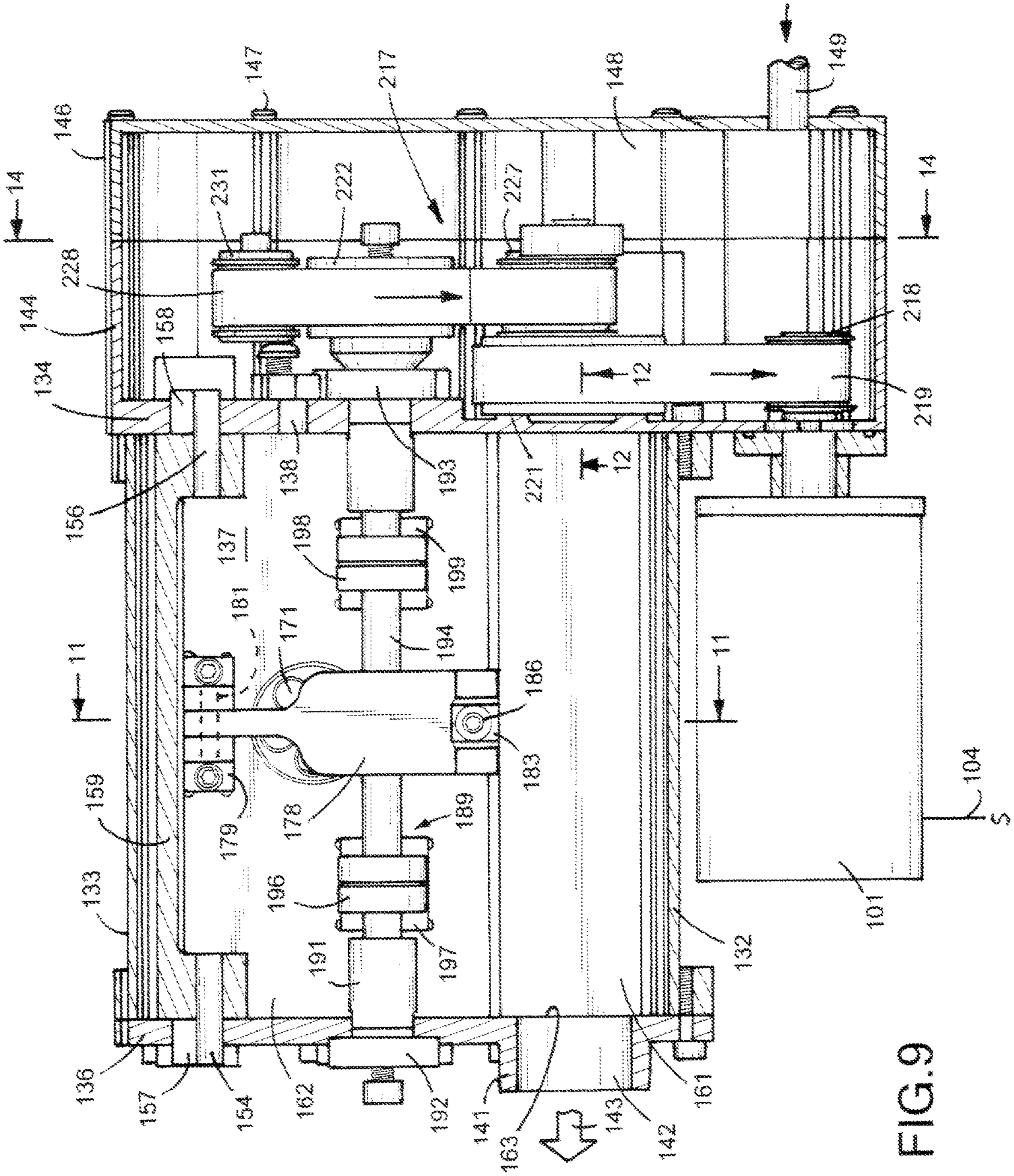
FIG. 9 is a sectional view taken along line 9-9 of FIG. 6.
Figure 13:
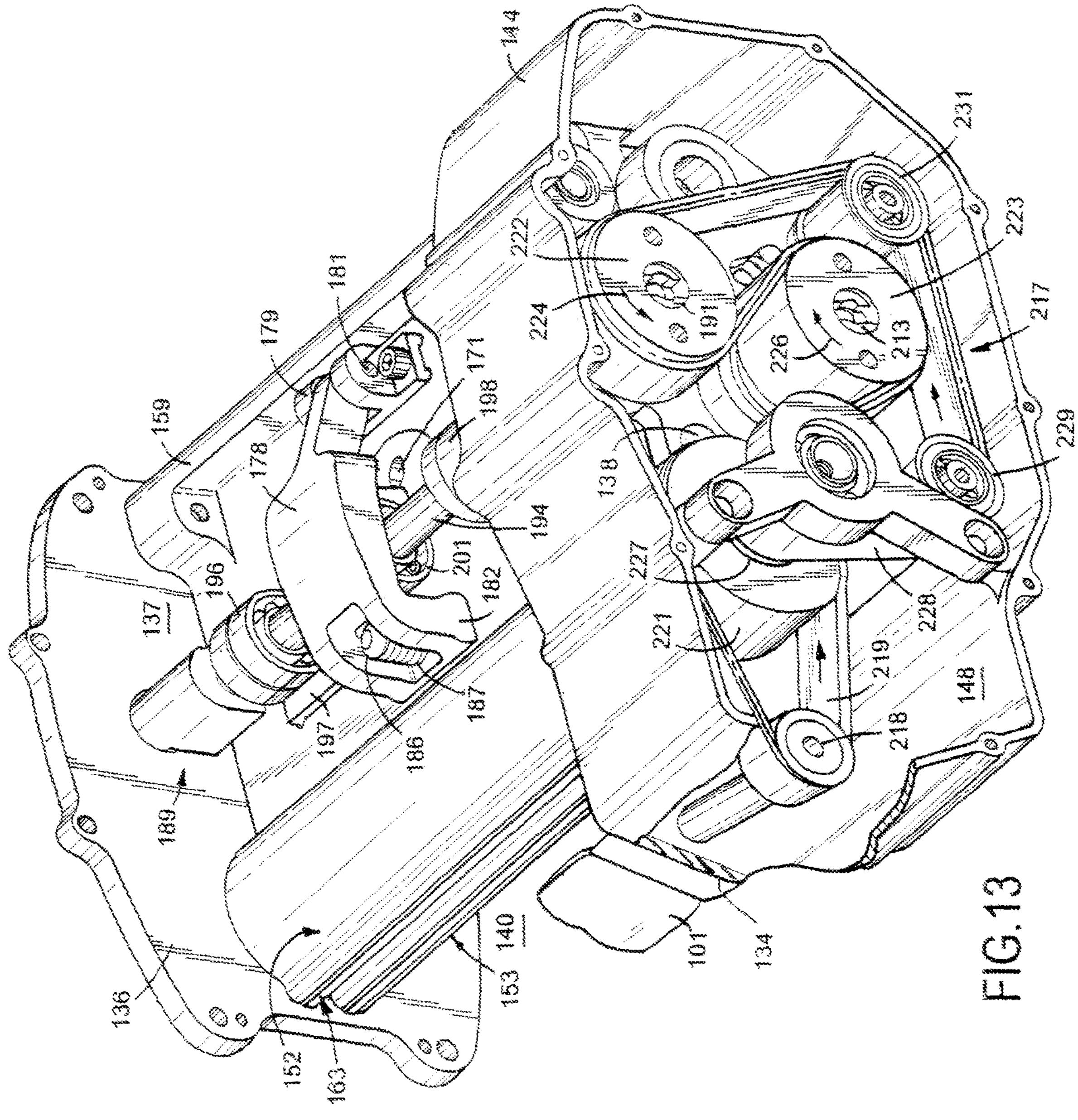
FIG. 13 is a perspective view of the air pulse generator of FIG. 5 with parts of the housing removed.
Figure 14:
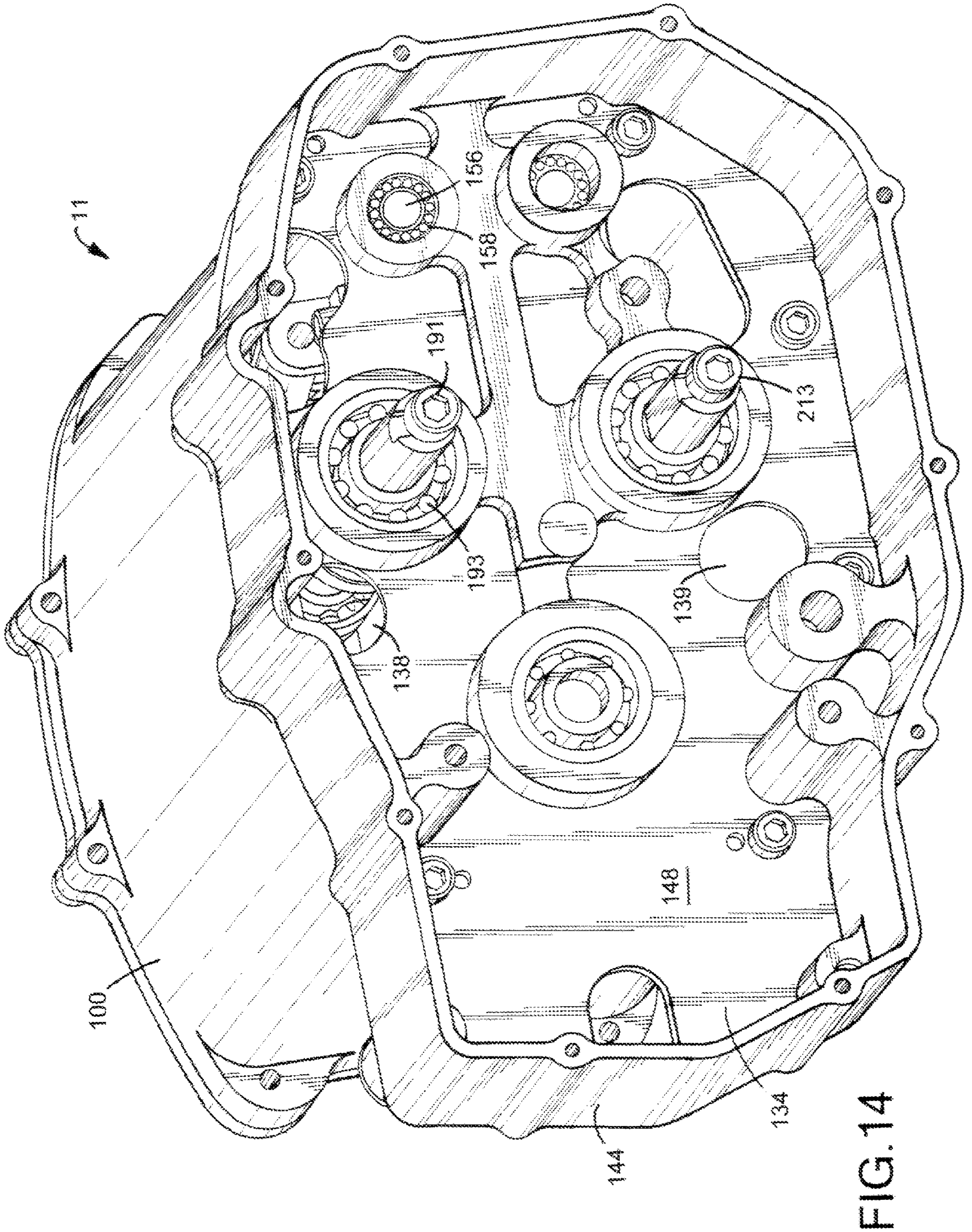
FIG. 14 is a perspective view taken along line 14-14 of FIG. 9.

A second housing 144 joined to adjacent interior wall 134 accommodates a cover 146 enclosing a manifold chamber 148, shown in FIGS. 9 and 13. A plurality of fasteners 147 secure housing 144 and cover 146 to interior wall 134. A tubular connector 149 mounted on cover 146 and connected to tube 131 allows air to flow from air flow control valve 118 into manifold chamber 148. Passages 138 and 139 are open to manifold chamber 148 and pumping chambers 137 and 140 to allow air to flow from manifold chamber 148 into pumping chambers 137 and 140.

Figure 10:
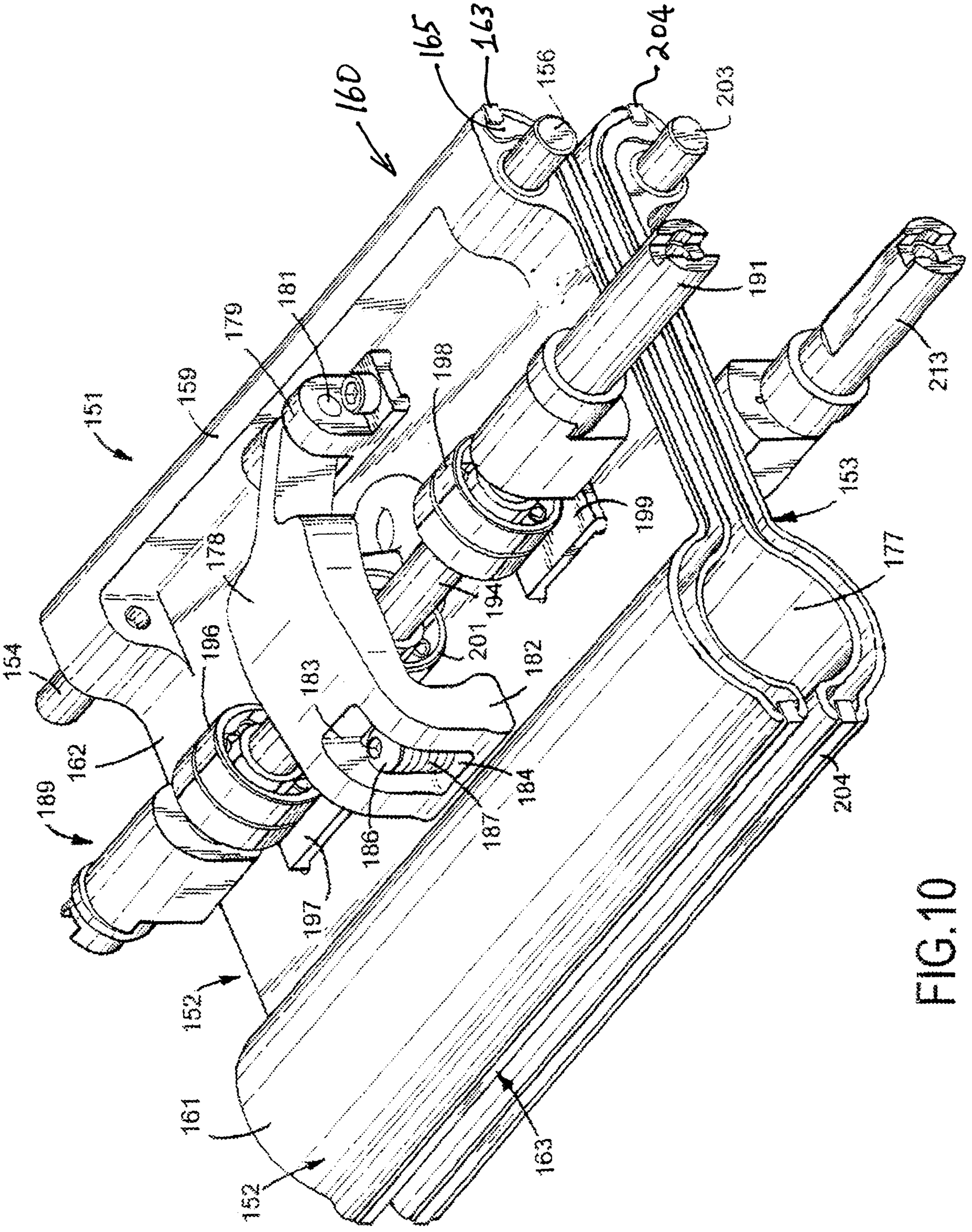
FIG. 10 is a perspective view of the air pulse displacer assembly of the air pulse generator of FIG. 5.
Figure 11:
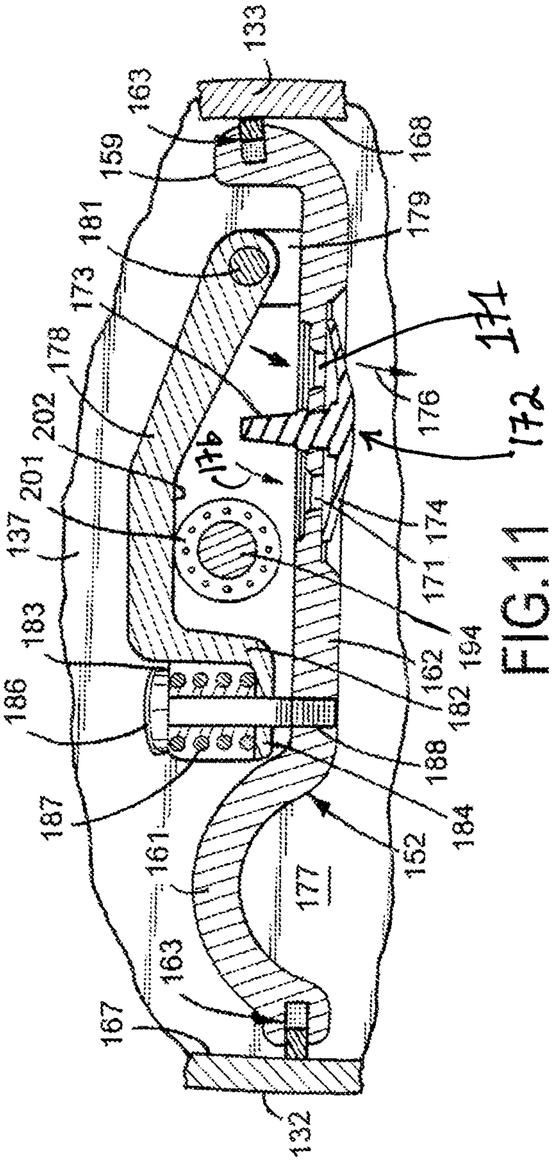
FIG. 11 is a sectional view taken along line 11-11 of FIG. 9.
Figure 12:
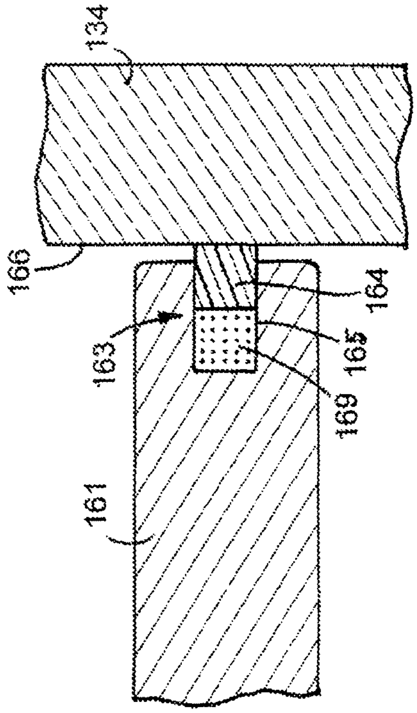
FIG. 12 is an enlarged sectional view taken along line 12-12 of FIG. 9.

As shown in FIGS. 9 and 10, an air displacer assembly 151 operates to draw air into pumping chambers 137 and 140. Air displacer assembly 151 has first and second rigid air displacers 152 and 153 operable to swing or pivot between first and second positions to pump and pulse air directed to garment 30. The air displacer assembly 151 may be a single rigid air displacer operable to pivot between first and second positions to provide air pressure pulses to garment 30. The single displacer includes the structures and functions of displacer 152 angularly moved with power transmission assembly 189. The opposite sides of rear ridge 159 of displacer 152 have outwardly extended axles or pins 154 and 156. Pin 154 is rotatably mounted with a bearing 157 on end wall 136. Pin 156 is rotatably mounted on interior wall 134 with a bearing 158. A single pivot member may be used to pivotally mount displacer 152 on housing 100. Displacer 152 is a rigid member that does not change its geometric shape when pivoting about the fixed transverse axis between the first and second positions, shown in FIGS. 15 and 16. Displacer 152 has a generally rectangular shape with a transverse rear ridge 159 and a semi-cylindrical front section 161. A generally flat middle section 162 joins rear ridge 159 to front section 161. As shown in FIG. 10, the entire outer periphery of the air displacer 152 has a recess or groove 165 for retaining a seal assembly 163. As shown in FIG. 12, seal assembly 163 has a rigid component rib 164 partly located within the groove 165 and an elastic component 169 located in the base of the groove 165. The elastic component 169 has a spring-like characteristic whereby the outer surface of the rigid rib 164 is forced (or biased or pushed) into sliding engagement with the inside surfaces of the walls 132, 133, 134 and 136 of the housing 100. FIG. 11 illustrates the outer surface of the rigid rib 164 in sliding engagement with the inside surfaces 167 and 168 of the front and rear walls 132 and 133, respectively. Likewise, FIG. 12 illustrates the outer surface of the rigid rib 164 in sliding engagement with the inside surface 166 of the interior wall 134. As such, with the outer surface of the rigid rib 164 biased into sliding engagement with the inside surfaces of the walls defining the enclosed space of the housing 100, the seal assembly 163 inhibits air flow along the outer periphery of the first and second air displacers. In some embodiments, the rigid rib 164 is a high density polymer rib. In certain embodiments, the spring-like elastic component 169 of seal assembly 163 is a low-density elastic foam or a close cell elastomeric foam material. The biasing force of the elastic component 169 also compensates for structural tolerances and wear of rigid rib 164. Other types of seals and spring biasing forces can be used with displacer 152 to engage walls 132, 133, 134 and 136.

As shown in FIG. 11, the middle section 162 of displacer 152 has a plurality of holes 171 providing openings that allow air to flow, shown by arrow 176, from pumping chamber 137 to pulsing chamber 177 located between first and second air displacers 152 and 153. A check valve 172 mounted on middle section 162 allows air to flow from pumping chamber 137 to pulsing chamber 177 and prevents the flow of air from pulsing chamber 177 back to pumping chamber 137. Check valve 172 is a one-piece flexible member having a stem 173 pressed into a hole in middle section 162 and an annular flexible flange 174 covering the bottoms of holes 171 to prevent the flow of air from pulsing chamber 177 back to pumping chamber 137 when the pressure of the air in pulsing chamber 177 is higher than the air pressure in pumping chamber 137. Other types and locations of check valves can be used to control the flow of air between pumping chamber 137 and pulsing chamber 177.

As shown in FIGS. 9, 10 and 11, each power transmission assembly 189 and 212 includes an anti-backlash device operable without lost motion to angularly move the first and second displacers 152 and 153 between first and second positions. The anti-backlash device comprises an arm 178 located above middle section 162 of displacer 152. A first end of arm 178 is pivotally connected to a support 179 with a pivot pin 181. Support 179 is fastened to the rear section 160 of displacer 152. The pivot axis of pin 181 is parallel with the pivot axis of pins 154 and 156. The second or front end 182 of arm 178 extends in a downward direction toward the top of middle section 162 adjacent the semi-cylindrical section 161. Front end 182 has an upright recess 183 and a bottom wall 184 spaced above the top of middle section 162 of displacer 152. An upright bolt 186 located within recess 183 and extended through bottom wall 184 is threaded into a hole 188 in middle section 162 of displacer 152. A coil spring 187 located between the head of bolt 186 and bottom wall 184 of arm 178 biases and pivots arm 178 toward the top of displacer 152. Arm 178 and coil spring 187 provide power transmission assembly 189 with anti-backlash functions and compensate for wear and thermal expansion. Arm 178 cooperates with a power transmission assembly 189 to pivot air displacer 152 for angular movement between first and second positions.

Power transmission assembly 189 is operatively associated with displacer 152 and arm 178 to angularly move displacer 152 toward and away from displacer 153 to draw air into pumping chamber 137 and compress and pulse air in pulsing chamber 177. Power transmission assembly 189 includes a crankshaft having a shaft 191 with one end rotatably mounted on end wall 136 with a bearing 192. The opposite end of shaft 191 is rotatably mounted on interior wall 134 with a bearing 193. Other structures can be used to rotatably mount shaft 191 on housing walls 134 and 136. Crankshaft includes a crank pin 194 offset from the axis of rotation of shaft 191. A first pair of cylindrical roller members 196 rotatable mounted on crank pin 194 engage a first pad 197 retained in a recess in middle section 162 of displacer 152. A second pair of cylindrical roller members 198 rotatably mounted on crank pin 194 engage a second pad 199 retained in a recess in middle section 162 of displacer 152. Roller members 196 and 198 are axially spaced on opposite sides of arm 178. As seen in FIG. 10, a roller member 201 rotatably mounted on the middle of crank pin 194 engages the bottom surface 202 of arm 178. Roller member 201 is spaced above the top of displacer 152. Rotation of shaft 191 moves crank pin 194 in a circular path whereby rollers members 196 and 198 angularly moves displacer 152 downwardly to the first (closed) position and roller member 201 angularly moves displacer 152 upwardly to the second (open) position. Spring 187 maintains arm 178 in continuous engagement with roller member 201 and creates reaction forces on pads 197 and 199 through roller members 196 and 198 thereby eliminating clearance, backlash or lost motion between arm 178 and roller member 201.

Figure 15:
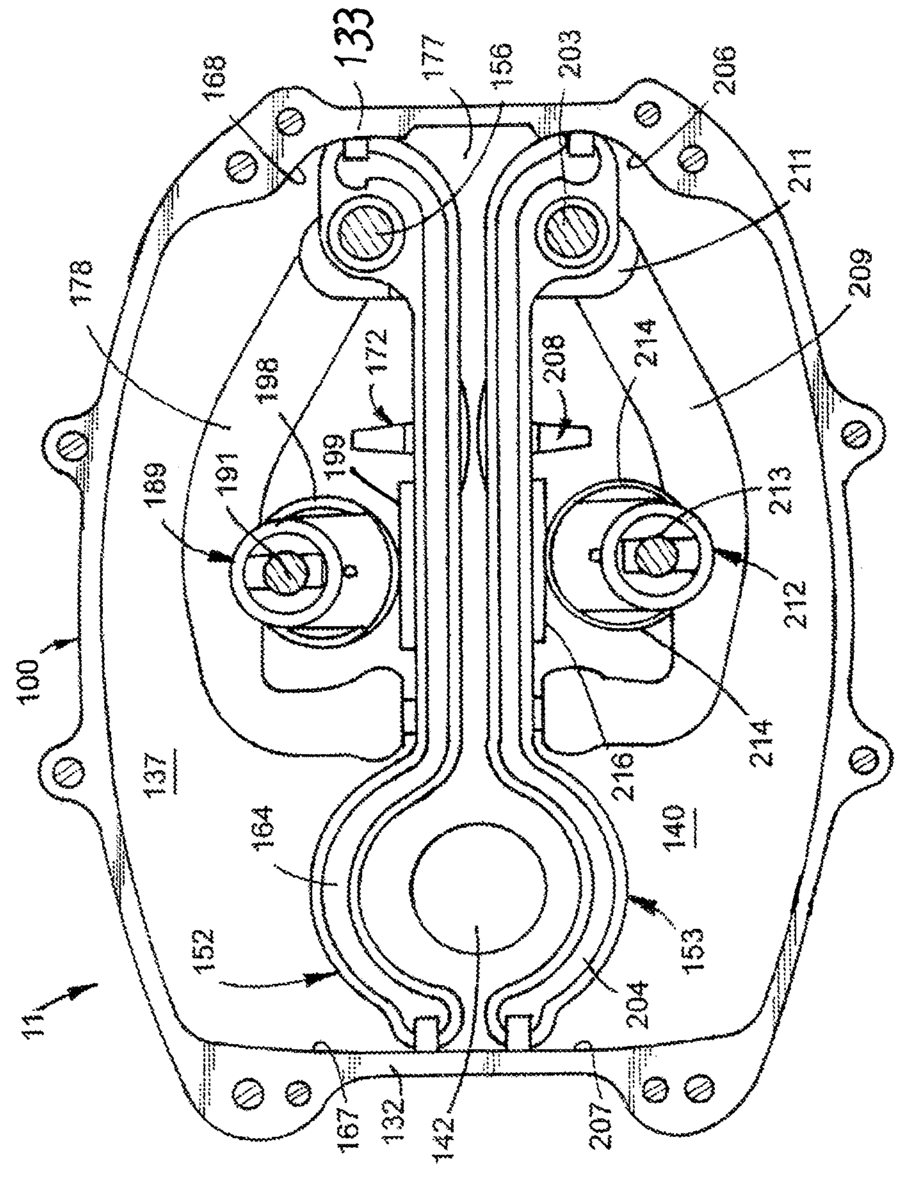
FIG. 15 is a sectional view taken along the line 15-15 of FIG. 5 showing the air pulse displacer assembly in the first (closed) position.
Figure 16:
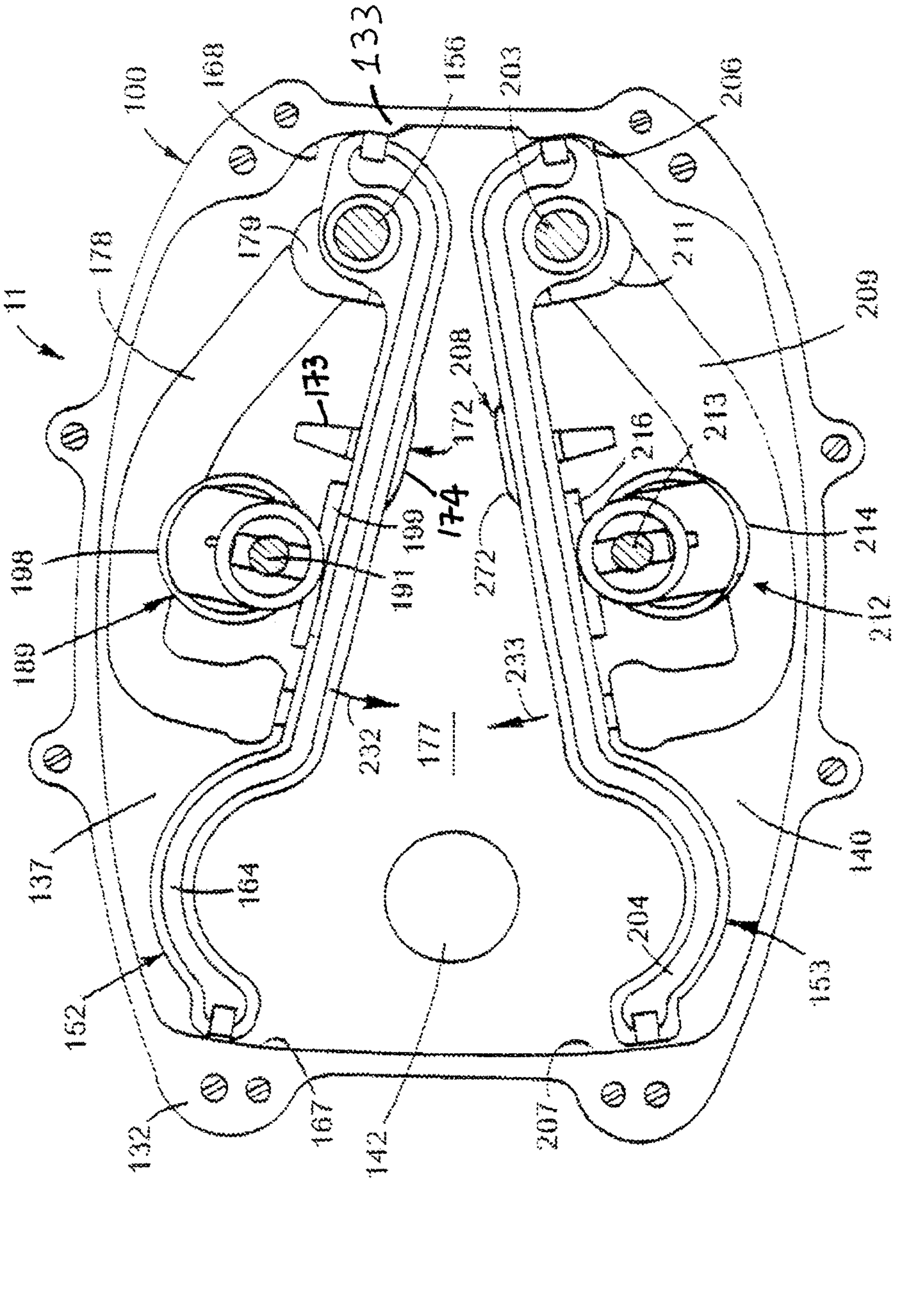
FIG. 16 is a sectional view similar to FIG. 15 showing the air pulse displacer assembly in the second (open) position.

Second air displacer 153 has the same structure as first air displacer 152. Axles or pins 203 pivotally mount the rear section of displacer 153. The axial axis of pins 203 is parallel to the axial axis of pins 154 and 156. The entire outer peripheral edges of displacer 153 has a seal 204 located in engagement with curved surfaces 206 and 207 of housing 100 as shown in FIGS. 15 and 16 and the inside surfaces of walls 134 and 136. Seal 204 has the same rib and spring as seal 163 shown in FIG. 12. The middle section of displacer 153 has holes associated with a check valve 208 to allow air to flow from pumping chamber 140 into pulsing chamber 177 and prevent the air in pulsing chamber 177 from flowing back to pumping chamber 140. Check valve 208 has the same stem and annular flexible flange as check valve 172 shown in FIG. 11. An arm 209 pivotally connected to a support 211 secured to the rear section of displacer 153 is operatively associated with a power transmission assembly 212. Power transmission assembly 212 operates to angularly move displacer 153 between first (closed) and second (open) positions as shown in FIGS. 15 and 16. Power transmission assembly 212 includes a crankshaft having a shaft 213 and roller members 214 engaging pads 216 mounted on displacer 153. Power transmission assembly 212 has the same structure as power transmission assembly 189. A check valve 208 mounted on displacer 153 controls the flow of air from pumping chamber 140 to pulsing chamber 177 and prevents the flow of air from pulsing chamber 177 back to pumping chamber 140. Check valve 208 has the same structure as check valve 172 shown in FIG. 11.

As shown in FIGS. 15 and 16, power transmission assemblies 189 and 212 are driven in opposite rotational directions with a power train assembly 217. Power train assembly 217, driven by electric motor 101, has a first belt drive comprising a timing pulley 218 drivably connected to motor 101. Timing pulley 218 accommodates an endless tooth belt 219 trained around a driven tooth timing pulley 221. A second belt drive powered by pulley 221 rotates a first pulley 222 connected to shaft 191 and a second pulley 223 connected to shaft 213 in opposite directions as shown by arrows 224 and 226. The second belt drive operates power transmission assemblies 189 and 212 to turn their respective crankshafts in opposite rotational directions to concurrently angularly move displacers 152 and 153 to first and second positions shown in FIGS. 15 and 16 thereby pulsing air in pulsing chamber 177. Pulley 227 driven by pulley 221 accommodates an endless serpentine double-sided tooth belt 228 that rides on idler pulleys 229 and 231 and trains about opposite arcuate segments of pulleys 222 and 223. The entire power train assembly 217 is located within manifold chamber 148 of second housing 144. The power train assembly 217 and power transmission assemblies 189 and 212 at least partially define a power drive system operable to angularly move the air displacers 152 and 153 to first and second positions to cause air to flow from pumping chambers 137 and 140 into pulsing chamber 177 and direct air pressure pulses out of pulsing chamber 177 into hose 61 and garment 30.

Figure 2:
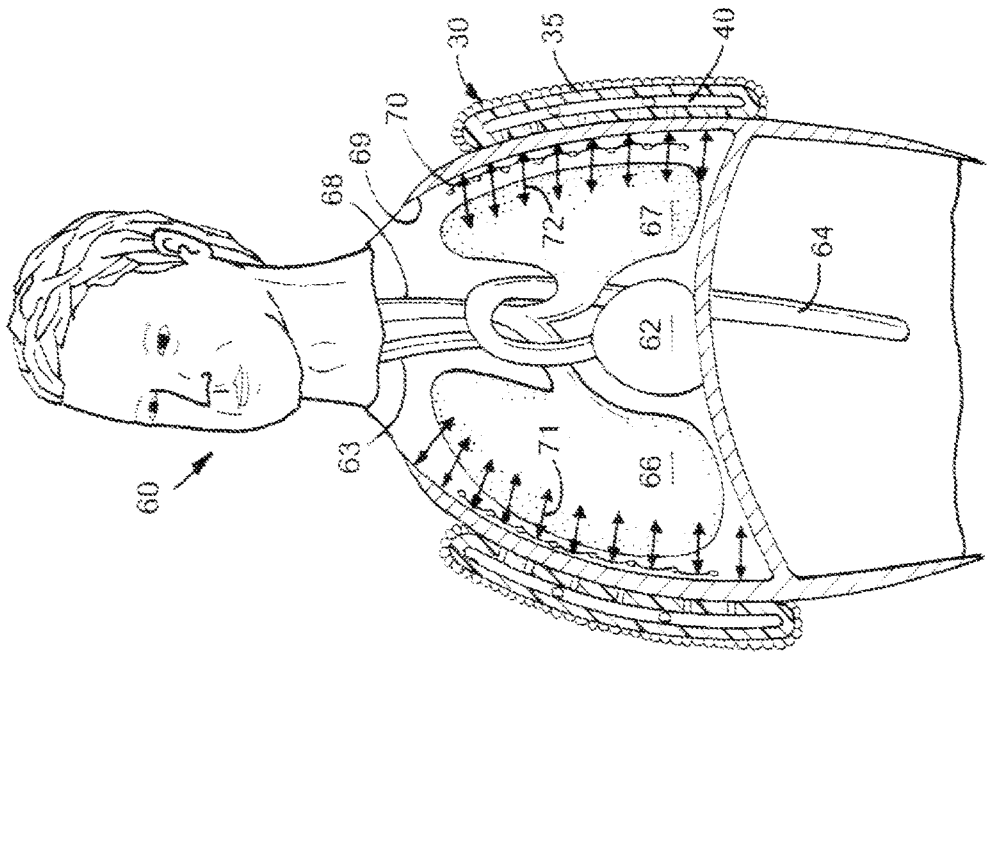
FIG. 2 is a front elevational view, partly sectioned, of the thoracic therapy garment of FIG. 1 located around the thorax of a person.

In use, as shown in FIGS. 1 to 3, garment 30 is placed about the person's upper body or thoracic wall 69. The circumferential portion of garment 30 includes an air core 35 having one or more enclosed chambers 40 that is maintained in a comfortable snug fit on thoracic wall 69. The elongated flexible hose 61 is connected to air core 35 and air pulse generator 11. Operation of air pulse generator 11 discharges air under pressure and high frequency air pressure pulses into hose 61 which are transferred to the enclosed chamber 40 of air core 35. As shown in FIGS. 2 and 3, high frequency pressure pulses 71 and 72 are transmitted from air core 35 to the person's thoracic wall 69 thereby subjecting the person's thoracic wall 69 to respiratory therapy. The person 60 or a care person sets the time, frequency and pressure controls 109, 110, 111 associated with control panel 23 to program the duration of operation of air pulse generator 11, the frequency of the air pressure pulses and the pressure of the air created by air pulse generator 11. The time program controls the operation of motor 101 that operates air displacers 152 and 153. As shown in FIGS. 15 and 16, air displacers 152 and 153 angularly pivot relative to each other between first and second positions. Air displacers 152 and 153 draw air into pumping chambers 137 and 140. The flow of air into pumping chambers 137 and 140 is regulated with air flow control valve 118. Adjustment of air flow control valve 118 with stepper motor 126 controls the pressure of the air discharged by generator 11 to air core 35 of garment 30. The flow of air into manifold chamber 148 is limited by air flow orifice member 128 to control maximum air flow into manifold chamber 148 and prevents excessive air pressure in garment 30. The air in pumping chambers 137 and 140 is forced through check valves 172 and 208 into pulsing chamber 177 located between air displacers 152 and 153. Angular movements of air displacers 152 and 153 toward each other pulses the air in pulsing chamber 177 and discharges air and air pulses through air outlet passage 142 into hose 61. Hose 61 transports air and air pulses to air core 35 of garment 30 thereby subjecting the person's thorax to pressure and high frequency pressure pulses.

As shown in FIG. 13, motor 101 drives power train assembly 217 to rotate the crankshafts of the power transmission assemblies 189 and 212 to concurrently angularly pivot air displacers 152 and 153 between first and second positions. Arms 178 and 209 pivotally mounted air displacers 152 and 153 cooperate with the crankshafts of the power transmission assemblies 189 and 212 to limit the angular movement of air displacers 152 and 153. Coil springs at the second or front end of arms 178 and 209, e.g., coil spring 187 at the second or front end of arm 178, provide power transmission assemblies 189 and 212 with anti-backlash functions and compensate for wear and thermal expansion.

Figure 17:
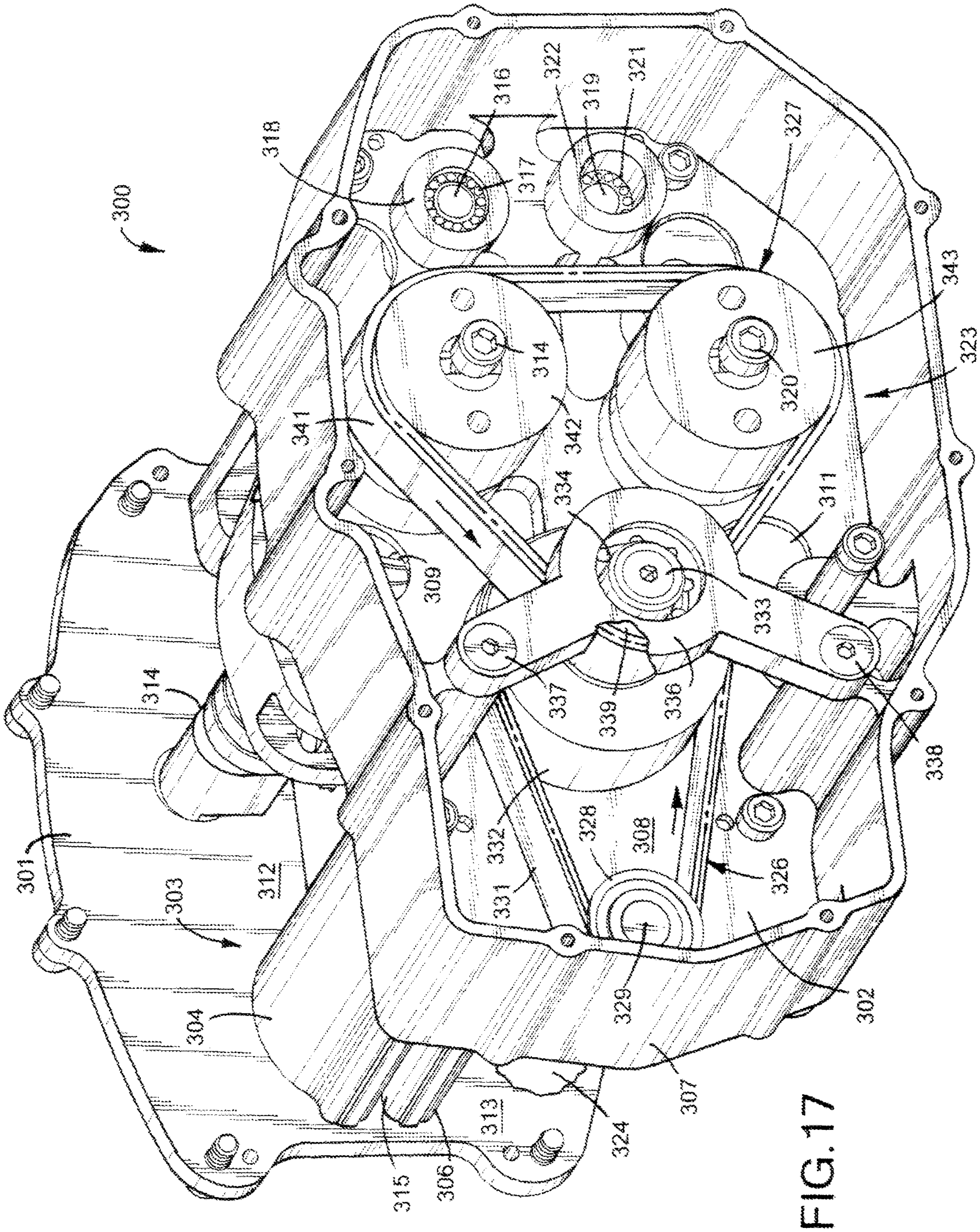
FIG. 17 is a perspective view of an alternative power drive system for rotating the crankshafts that angularly move the displacers of the air pulse displacer assembly.
Figure 18:
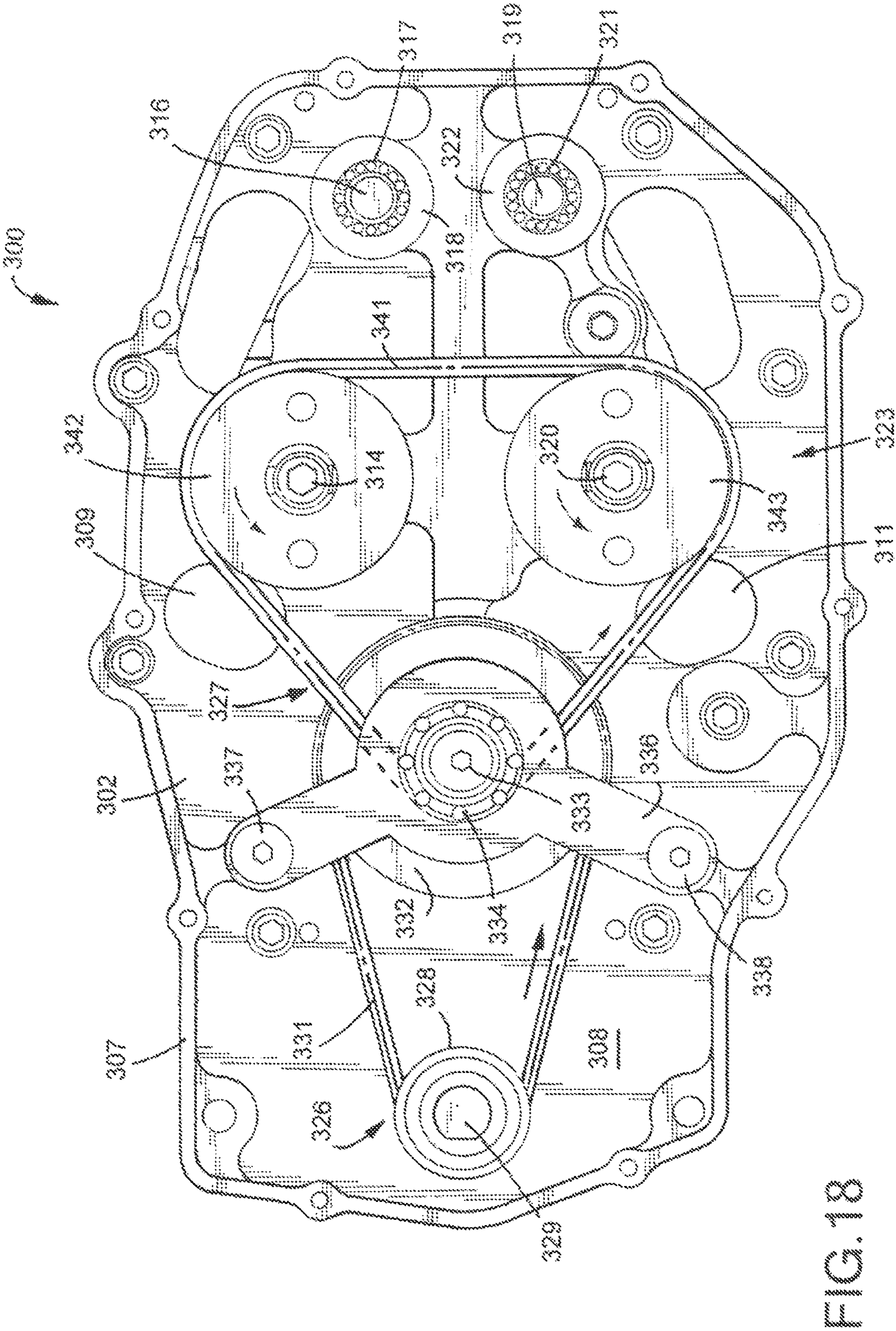
FIG. 18 is a right end elevational view of the power drive system of FIG. 17.

A modification of the air pulse generator 300, shown in FIGS. 17 and 18, is operable to establish air pressure and air pulses which are directed by hose 61 to garment 30 to apply repetitive forces to the thoracic wall of a person. Air pulse generator 300 has a housing including end walls 301 and 302. A displacer assembly 303 located between end walls 301 and 302 has a pair of displacers 304 and 306 pivotally mounted on end walls 301 and 302 for angular movements relative to each other to draw air from a manifold chamber 308 into first and second air pumping chambers 312 and 313. The air in pumping chambers 312 and 313 flows through check valves mounted on displacers 304 and 306 into a pulsing chamber 315 located between displacers 304 and 306. Displacers 304 and 306 have the same structure and functions as displacers 152 and 153 shown in FIGS. 9, 15 and 16 which are incorporated herein by reference. As shown in FIG. 18, displacer 304 has an axle or pin 316 retained in a bearing 317 mounted in a cylindrical boss 318 joined to end wall 302. The opposite side of displacer 304 has an axle or pin rotatable mounted on end wall 301. Displacer 306 located below displacer 304 has an axle or pin 319 retained in a bearing 321 mounted in a cylindrical boss 322 joined to end wall 302. Displacers 304 and 306 angularly move relative to each other about laterally spaced parallel horizontal axes of pins 316 and 319. A housing or casing 307 joined to end wall 302 surrounds manifold chamber 308. A cover with an air inlet tubular member (not shown) attached to housing 307 encloses manifold chamber 308. End wall 302, shown in FIG. 18, has passages or openings 309 and 311 to air to flow from manifold chamber 308 into pumping chambers 312 and 313. Crankshafts 314 and 320 operate to angularly move displacers 304 and 306 in opposite arcuate directions to draw air from manifold chamber 308 through openings 309 and 311 and into pumping chambers 312 and 313 and pulse air in pulsing chamber 315 whereby air pressure and air pulses are directed by hose 61 to garment 30.

A power drive system 323 driven with an electric motor 324 rotates crankshafts 314 and 320 whereby the crankshafts concurrently angularly move displacers 304 and 306. Power drive system 323 has a first power train assembly 326 driving a second power train assembly 327 that rotates crankshafts 314 and 320. First power train assembly 326 has a drive timing pulley 328 mounted on motor drive shaft 329 engageable with an endless tooth belt 331 located around a driven timing pulley 332. Pulley 332 is secured to a shaft 333 retained in a bearing 334 mounted on a fixed support 336. Support 336 is attached to housing 307 with fasteners 337 and 338. Second power train assembly 327 has a drive timing pulley 339 mounted on shaft 333. A bearing 334 holds shaft 333 on support 336. Belt 341 extended around timing pulleys 339, 342 and 343 rotates pulleys 342 and 343 mounted on crankshafts 314 and 320 thereby rotating crankshafts 314 and 320 and angularly moving displacers 304 and 306 relative to each other. The movement of displacers 304 and 306 draws air into manifold chamber 308 and through openings 309 and 311 into pumping chambers 312 and 313. When the air pressure in pumping chambers 312 and 313 is greater than the air pressure in pulsing chamber 315, the air flows through the check valves from pumping chambers 312 and 313 into pulsing chamber 315. When the displacers 304 and 306 move toward each other, air pressure and air pulses are forced into hose 61 and carried by hose 61 to the air core 35 of garment 30. The air pressure and air pulses in air core 35 of garment 30 subjects the thoracic wall of the person with repetitive forces.

Figure 19:
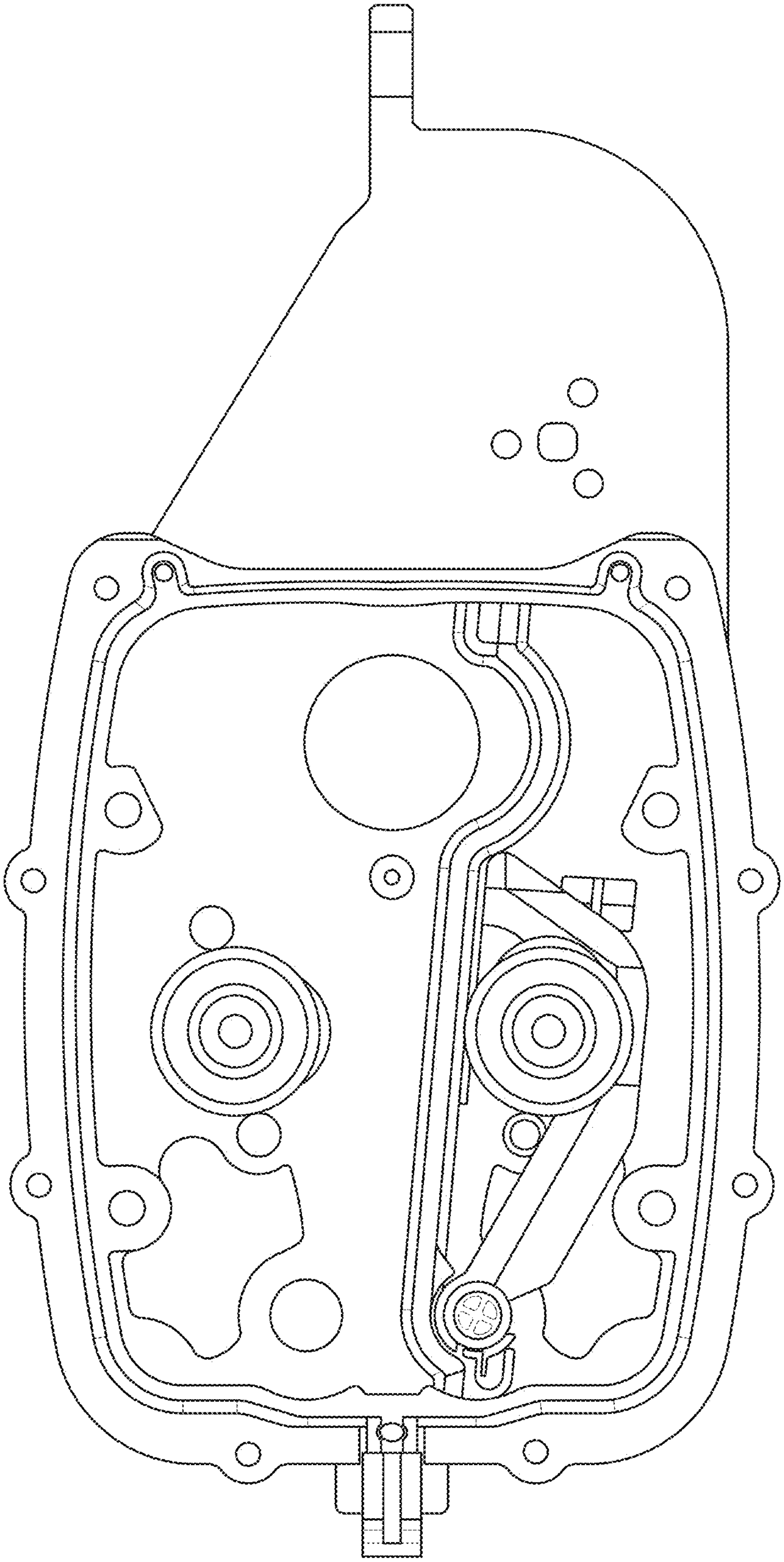
FIG. 19 is a perspective view of an air pulse generator having only one rigid air displacer.

FIG. 19 illustrates an alternative embodiment of an air pulse generator. The air pulse generator includes only one rigid air displacer, the rigid air displacer being operable to pivot between first and second positions within an air pulse generator housing to provide air pressure pulses.

The body pulsing apparatus and method has been described as applicable to persons having cystic fibrosis. The body pulsing apparatus and method is applicable to bronchiectasis persons, post-surgical atelectasis, and stage neuromuscular disease, ventilator dependent patients experiencing frequent pneumonias, and persons with reduced mobility or poor tolerance of Trendelenburg position. Person with secretion clearance problems arising from a broad range of diseases and conditions are candidates for therapy using the body pulsating apparatus and method of the invention.

The body pulsating apparatus and method disclosed herein has one or more angularly movable air displacers and programmed controls for the time, frequency and pressure operation of the air pulse generator and method. It is understood that the body pulsating apparatus and method is not limited to specific materials, construction, arrangements and method of operation as shown and described. Changes in parts, size of parts, materials, arrangement and locations of structures may be made by persons skilled in the art without departing from the invention.

The invention claimed is:

1. An apparatus for applying pressure and high frequency pressure pulses to the thorax of a person, comprising:
- an air pulse generator having user programmable controls, the air pulse generator comprising:
  - an air pumping chamber;
  - an air pulsing chamber: and
  - an air displacer assembly, the air displacer assembly comprising:
    - a first displacer and a second displacer;
    - wherein the first and second displacers are mounted on opposite sides of the air pulsing chamber and are configured to be angularly moved between first and second positions to move air through and pulse air from the air pulse generator;
  - a check valve operable to allow air to flow from the air pumping chamber into the air pulsing chamber and prevent air from flowing from the air pulsing chamber into the air pumping chamber;
  - a first anti-backlash device associated with the first displacer, the first anti-backlash device comprising a first arm and a first spring, the first spring pivoting the first arm towards a top surface of the first displacer and the first arm pivoting the first displacer between the first and second positions;

a second anti-backlash device associated with the second displacer, the second anti-backlash device comprising a second arm and a second spring, the second spring moving the second arm towards a top surface of the second displacer and the second arm moving the second displacer between the first and second positions, a seal assembly associated with the air pulse generator;

a garment having an air core, the garment being adapted to be located on the thorax of the person for subj ecting the thorax of the person to the pressure and high frequency pressure pulses from the air pulse generator, wherein the garment includes a single air inlet connector; and no more than one hose coupling the air pulse generator to the thoracic garment for transmitting the pressure and high frequency pressure pulses from the air pulse generator to the garment, wherein the hose is received by the air inlet connector.

2. The apparatus of claim 1, wherein the user programmable controls comprise time, frequency, and pressure controls.

3. The apparatus of claim 1, wherein a pressure of the high frequency pressure pulses is coordinated with a frequency of the high frequency pressure pulses such that the air pressure transmitted to the garment is substantially maintained at a selected pressure when the frequency of the air pulses is changed.

4. The apparatus of claim 1, wherein the air pulse generator includes an air outlet passage and the garment includes an air inlet passage and wherein the hose couples the air outlet passage of the pulse generator with the air inlet passage of the thoracic garment via the air inlet connector.

5. The apparatus of claim 1, wherein the garment includes an elongated flexible bladder having a plurality of elongated parallel chambers for accommodating air.

6. The apparatus of claim 1, wherein the air inlet connector is joined to a lower portion of the air core and releasably coupled to the hose, the hose being coupled to an air pulse outlet of the air pulse generator.

7. The apparatus of claim 1, further comprising a control, the controller being controlled with the user programmable controls, wherein the controller includes a look-up data table to control operation of the motor, speed of the motor, and pressure of pressure pulses directed to the garment.

8. The apparatus of claim 7, wherein the look-up table is an array of digital data of motor speed and air pressures created by the air pulse generator.

9. The apparatus of claim 1, further comprising an air flow control valve having a variable orifice operable to restrict flow of air into and out of the air pulse generator.

10. The apparatus of claim 1, wherein the air displacer assembly does not include a diaphragm.

11. The apparatus of claim 1, wherein the first displacer and the second displacer are rigid air displacers operable to pivot between the first and second positions to pump and pulse air.

12. The apparatus of claim 1, wherein the air pulse generator further comprises a manifold chamber, wherein an internal wall separates the air pulsing chamber from the manifold chamber.

13. The apparatus of claim 12, further comprising first and second air pumping chambers, wherein the first displacer separates the first air pumping chamber from the air pulsing chamber and wherein the second -aif displacer separates the second air pumping chamber from the pulsing chamber.

14. The apparatus of claim 1, wherein each displacer includes a groove, wherein the seal assembly is provided in the groove of the first displacer and a second seal assembly is provided in the groove of the second displacer.

15. The apparatus of claim 14, wherein each of the first and second seal assemblies comprises a rigid rib and an elastic component, and wherein the rigid rib of the first seal assembly is partly located within the groove of the first seal assembly and the elastic component of the first seal assembly is located in a base of the groove of the first seal assembly, and the rigid rib of the second seal assembly is partly located within the groove of the second seal assembly and the elastic component of the second seal assembly is located in a base of the groove of the second seal assembly.

16. The apparatus of claim 1, further comprising a power drive system operable to angularly move the first displacer and the second displacer to draw air into the air pumping chamber and force air through the check valve into the air pumping chamber and out of the air pulsing chamber into the hose.

17. The apparatus of claim 16, wherein the first and second anti-backlash devices are operable to minimize lost motion when angularly moving the first displacer and the second displacer.

18. An apparatus for applying pressure and high frequency pressure pulses to the thorax of a person, comprising:

a housing having an enclosed space;

an air displacer assembly located in said enclosed space and separating the enclosed space into an air pumping chamber and an air pulsing chamber, said air displacer assembly comprising:

a first rigid displacer; and a second rigid displacer;

wherein the first and second rigid displacers are operable to pivot between first and second positions to pump and pulse air;

a first power transmission assembly operable to angularly move the first rigid air displacer between the first and second positions;

a second power transmission assembly operable to angularly move the second rigid air displacer between the first and second positions;

a power train operably connected to the first and second transmission assemblies to concurrently operate the first and second power transmission assembles to angularly move the first and second air displacers toward and away from each other;

a seal assembly associated with the air displacer assembly;

a first anti-backlash device associated with the first rigid displacer, the first anti-backlash device comprising a first arm and a first spring, the first spring pivoting the first arm towards a top surface of the first rigid displacer and the first arm pivoting the first rigid displacer between the first and second positions;

a second anti-backlash device associated with the second rigid displacer, the second anti-backlash device comprising a second arm and a second spring, the second spring moving the second arm towards a top surface of the second rigid displacer and the second arm moving the second rigid displacer between the first and second positions;

a reversible garment having an air core, the garment being adapted to be located on the thorax of the person for subjecting the thorax of the person to the pressure and high frequency pressure pulses from the air pulse generator; and fewer than two hoses coupling the air pulse generator to the thoracic garment for transmitting the air pressure and the high frequency pressure pulses from the air pulse generator to the thoracic garment.

19. The apparatus of claim 18, wherein each air displacer includes a groove, wherein the seal assembly is provided in the groove of the first displacer and a second seal assembly is provided in the groove of the second displacer.

20. The apparatus of claim 19, wherein each of the first and second seal assemblies comprises a rigid rib and an elastic component, and wherein the rigid rib of the first seal assembly is partly located within the groove of the first seal assembly and the elastic component of the first seal assembly is located in a base of the groove of the first seal assembly, and the rigid rib of the second seal assembly is partly located within the groove of the second seal assembly and the elastic component of the second seal assembly is located in a base of the groove of the second seal assembly.

21. An apparatus for applying pressure and high frequency pressure pulses to the thorax of a person, comprising:

an air pulse generator having user programmable controls, the air pulse generator including only one rigid air displacer, the rigid air displacer being operable to pivot between first and second positions within an air pulse generator housing to provide air pressure pulses;

a power transmission assembly operable to angularly move the rigid air displacer between the first and second positions;

an anti-backlash device associated with the rigid air dosplacer, the anti-backlash device comprising a first arm and a first spring, the first spring pivoting the first arm towards a top surface of the rigid air displacer and the first arm pivoting the rigid air displacer between the first and second positions;

a seal assembly associated with the air pulse generator;

a garment adapted to be located on the thorax of the person for subjecting the thorax of the person to the pressure and high frequency pressure pulses; and a single hose coupling the air pulse generator to the thoracic garment for transmitting the pressure and the high frequency pressure pulses from the air pulse generator to the thoracic garment.

* * * * *